INVENTORS
KARL HEINZ BERGMANN
WERNER SCHADOWSKI

Michael J. Striker
ATTORNEY

INVENTORS
KARL HEINZ BERGMANN
WERNER SCHADOWSKI

Michael J. Striker
ATTORNEY

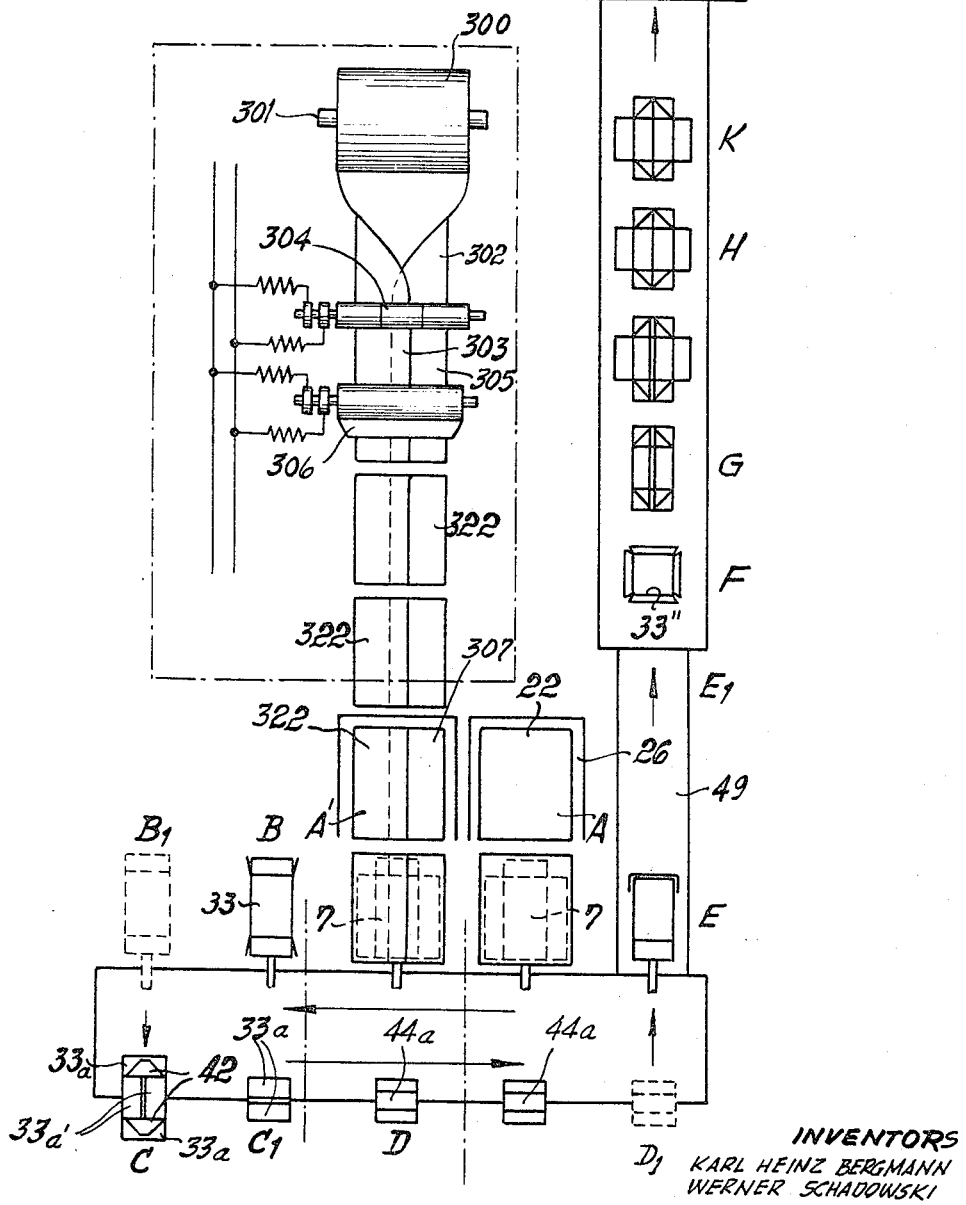

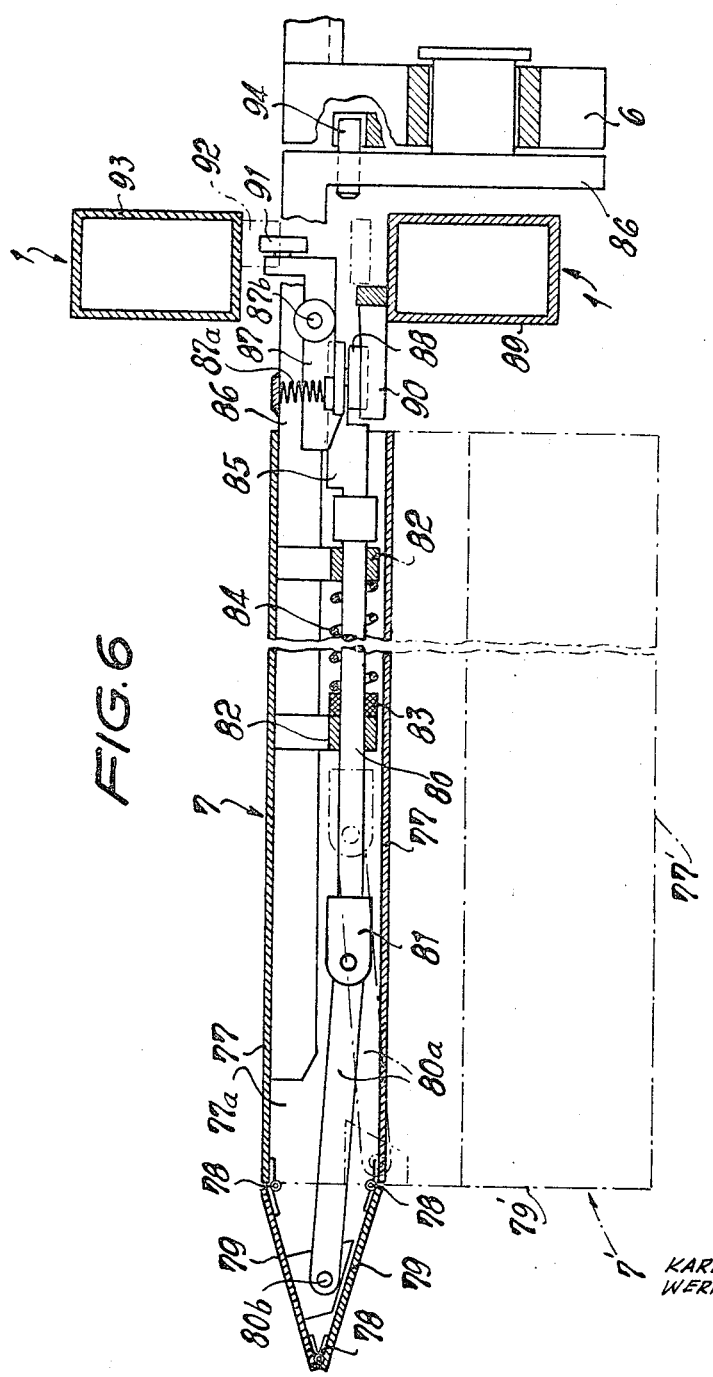

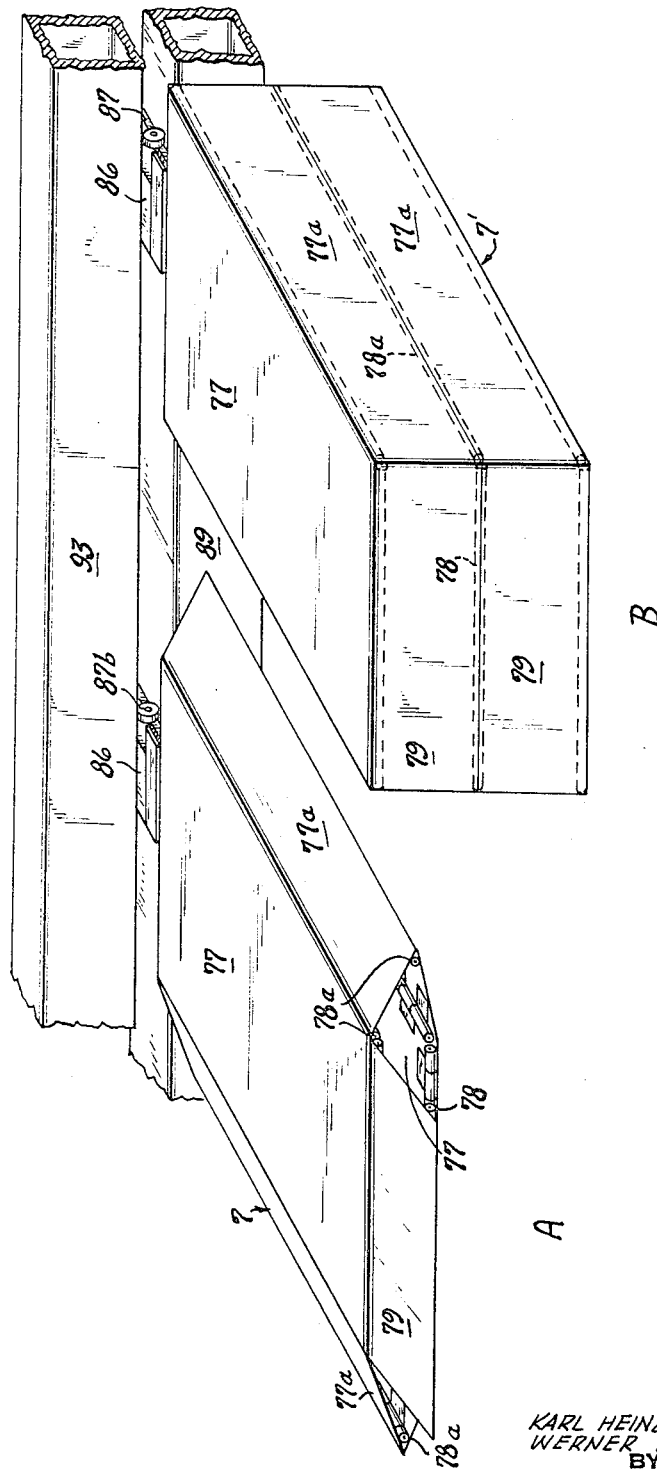

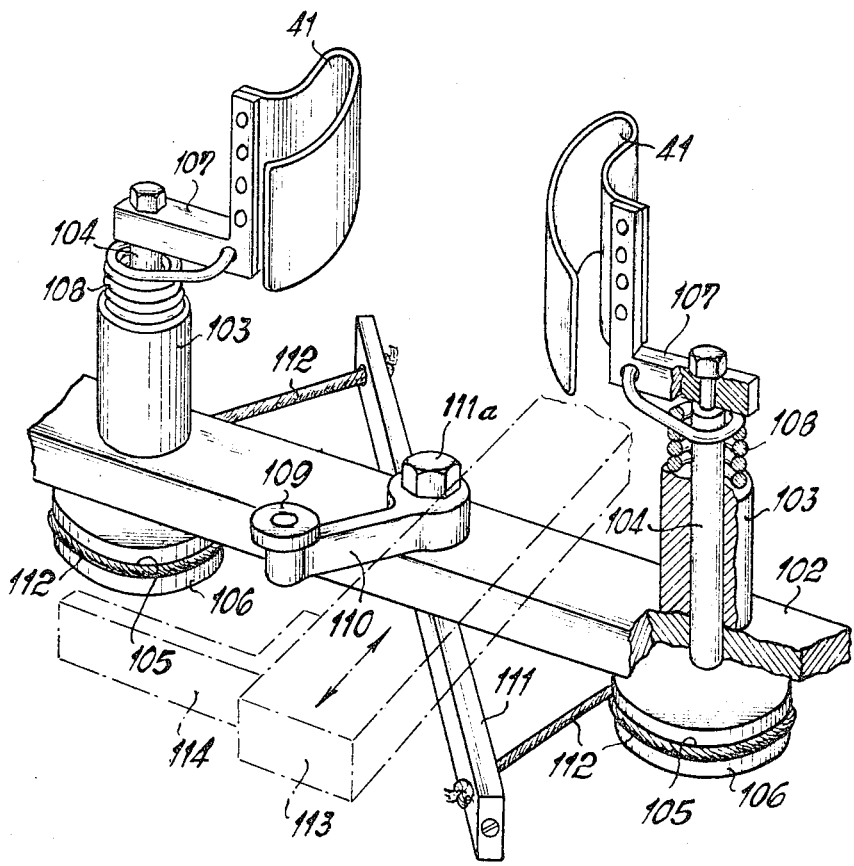

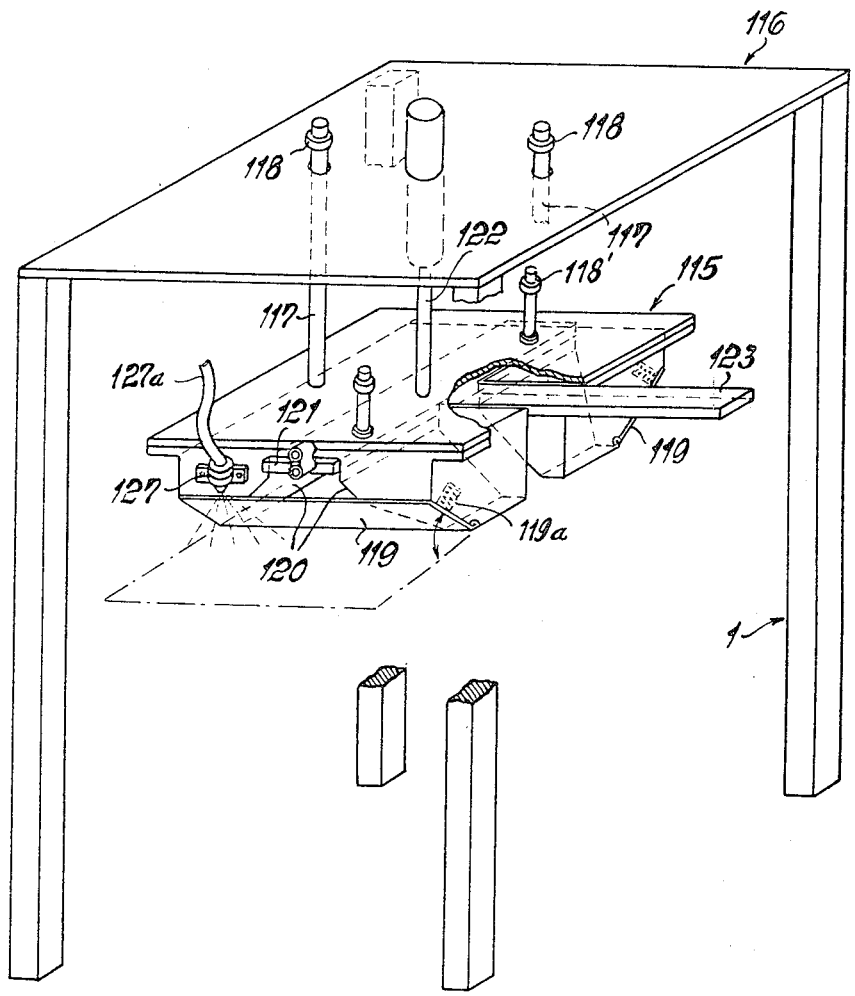

United States Patent Office 3,380,222
Patented Apr. 30, 1968

3,380,222
METHOD AND APPARATUS FOR FILLING, SEALING, AND PACKING OF BAGS AND SIMILAR CONTAINERS
Karl Heinz Bergmann, Lampertheim, and Werner Schadowski, Mannheim-Sandhofen, Germany, assignors to Zellstoffabrik Waldhof, Mannheim-Waldhof, Germany
Filed Sept. 21, 1964, Ser. No. 397,746
Claims priority, application Germany, Sept. 21, 1963, Z 10,369; June 19, 1964, Z 10,921
55 Claims. (Cl. 53—27)

The present invention relates to handling of bags and similar collapsible containers, and more particularly to a method and apparatus for automatically filling, sealing and enclosing or packing collapsible bags in a continuous operation. Still more particularly, the invention relates to a method and apparatus for storing liquid, liquefied or flowable solid materials in sealed bags and for simultaneously packing such bags in boxes made of cardboard or similar material whose resistance to deformation exceeds the resistance of a bag.

It is well known to store flowable materials in wooden, metallic, rigid plastic or vitreous containers or boxes or in deformable containers in the form of envelopes, bags or sacks made of thermoplastic sheet material, paper, metallic foil or a combination of such materials. In recent years, such containers are replaced in many industries by composite containers wherein an inner envelope (hereinafter called bag) or readily deformable material is surrounded by an outer envelope (hereinafter called box) which preferably consists of comparatively stiff paperboard or pasteboard, of laminated plastic, of reinforced paper sheet and/or of a combination of two or more such materials. For example, the bag may constitute an airtight seal around a measured quantity of flowable material and the box constitutes a protective armor around the bag. A serious drawback of such dual envelopes is that several manipulations must be performed by hand. Thus, it is customary to produce plastic bags in a bag machine and to thereupon insert such bags into boxes consisting of cardboard or the like. The insertion may be made prior to or subsequent to filling with flowable material. It is extremely difficult to insure that each bag is inserted in its box in the same way as the preceding bags, particularly if the bag and/or the box must be provided with readily removable or foldable extensions and/or flaps which are to form an outlet for convenient evacuation of flowable material by the ultimate user and/or a means for facilitating rapid opening of the box so that the user may gain access to the bag. The main problem is seen to reside in that it is very difficult to insert a bag into a box in such a way that the bag remains in optimum position for filling and subsequent sealing. The closing of boxes also presents a number of problems and is normally carried out manually by skilled operators which adds to the cost of the operation. For example, when a thermoplastic bag is to be sealed by welding, the presence of creases in the panels to be welded to each other invariably results in leakage and eventual contamination or escape of enclosed flowable material. Such leakage may result in contamination or destruction of adjoining packages, particularly when the packages are stacked in storage or for transport. Manual handling of highly flexible thermoplastic sheet material is a procedure which has prevented the use of dual envelopes from gaining even wider acceptance than such envelopes enjoy at the present time.

Accordingly, it is an important object of the present invention to provide a novel and fully automatic method of filling, sealing and packing collapsible bags in boxes at a high rate of speed, within a small area and in a comparatively simple apparatus.

Another object of the invention is to provide a method of the just outlined characteristics according to which accurately measured quantities of liquid, liquefied or comminuted solid material may be packed in dual envelopes without the danger of spillage, leakage or contamination and in such a way that the operation is fully automatic from the start to the ultimate step.

An additional object of the invention is to provide a method of forming, filling and sealing or closing dual envelopes in such a way that the filling and sealing of the inner envelope takes place simultaneously with insertion and attachment of the inner envelope to the outer envelope, and that the handling of the outer envelope is nearly completed at the time the inner envelope is sealed so that the number of consecutive treating stations is reduced to a minimum.

A further object of our invention is to provide a novel method of assembling pairs of prefabricated collapsible envelopes and of simultaneously filling the inner envelope in a time-, space- and money-saving operation.

A concomitant object of the invention is to provide a method according to which a single outer envelope may be assembled with one or more inner envelopes to form a substantially prismatic package which can withstand rough handling, which may be stored for long periods of time without risking damage to or destruction of its contents, which can be produced in many desired sizes or shapes, and which can be used with equal advantage for reception of liquid, liquefiable or comminuted solid materials.

A further object of our invention is to provide a novel apparatus for the practice of the above outlined method and to provide the apparatus with improved manipulating mechanisms or units which may be utilized to carry out the steps of our method in a time- and space-saving manner.

An additional object of the invention is to provide a novel spreader device which may be used in our apparatus to facilitate rapid, accurate and convenient assembly of prefabricated inner envelopes with prefabricated outer envelopes.

Another object of the invention is to provide a novel system of conveyors which transport the envelopes along the various processing stations.

A further object of the invention is to provide a novel erecting device which is used in the improved apparatus and which enables the envelopes to take optimum positions during filling with liquid, liquefied or flowable solid material.

Still another object of the invention is to provide novel feeding devices which can apply bags and boxes around spreaders in a fully automatic way and without damage thereto.

A further object of the invention is to provide a novel folding device which may be used in an apparatus of the above outlined characteristics.

Another object of the invention is to provide a novel stretching device which allows for leakproof sealing of filled bags.

Briefly stated, one feature of our invention resides in the provision of a method of anchoring, filling and enclosing collapsible bags of the type having a closed end provided with at least one extension and an open end in collapsible boxes of the type having two pairs of opposed flaps at each end thereof. The method comprises forming a stack of prefabricated bags, consecutively removing bags from the stack and expanding the thus removed bags, forming a stack of collapsed boxes, consecutively removing collapsed boxes from the last named stack and expanding the thus removed boxes, consecutively introducing expanded bags into expanded boxes so that the extensions are surrounded by pairs of flaps at one end of the corresponding boxes, folding one pair of opposed flaps at the one end of each consecutive box to closed position so that the corresponding extension projects beyond the thus folded flaps, folding the extensions of consecutive bags and the other pair of opposed flaps at the one end of each consecutive box over the one pair of flaps to close the one end of each consecutive box and to simultaneously retain the extensions between the corresponding pairs of opposed flaps, consecutively filling the thus anchored bags with measured quantities of flowable material, consecutively sealing the open ends of this filled bags, and closing the flaps at the other end of each consecutive box to completely enclose the respective bag.

Instead of forming a stack of collapsed bags, we may resort to a bag making machine which delivers collapsed bags seriatim to a first feeding station at which the bags are expanded on suitable spreaders and advance to a second feeding station at which an expanded box is applied around each consecutive bag. We also contemplate using composite bags each of which comprises two or more interfitted envelopes.

Once a bag is properly anchored in the corresponding box, it is rather simple to carry out the filling, sealing and closing operations in such a way that each bag remains in the same position with respect to its box and that the steps which follow the anchoring step may be carried out at a rapid rate and by resorting to comparatively simple apparatus.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 5 is a diagrammatic top plan view of a modified apparatus;

FIG. 6 is an enlarged longitudinal section through a portion of a spreader;

FIG. 6a is a perspective view of two adjoining spreaders one of which is shown in contracted and the other of which is shown in extended position;

FIG. 8 is an enlarged perspective view of a pressing device which keeps the extensions at the closed end of a bag from interfering with the transfer of an expanded box onto the extended spreader; and FIG. 9 is a perspective view of the first folding station.

Figure 1:
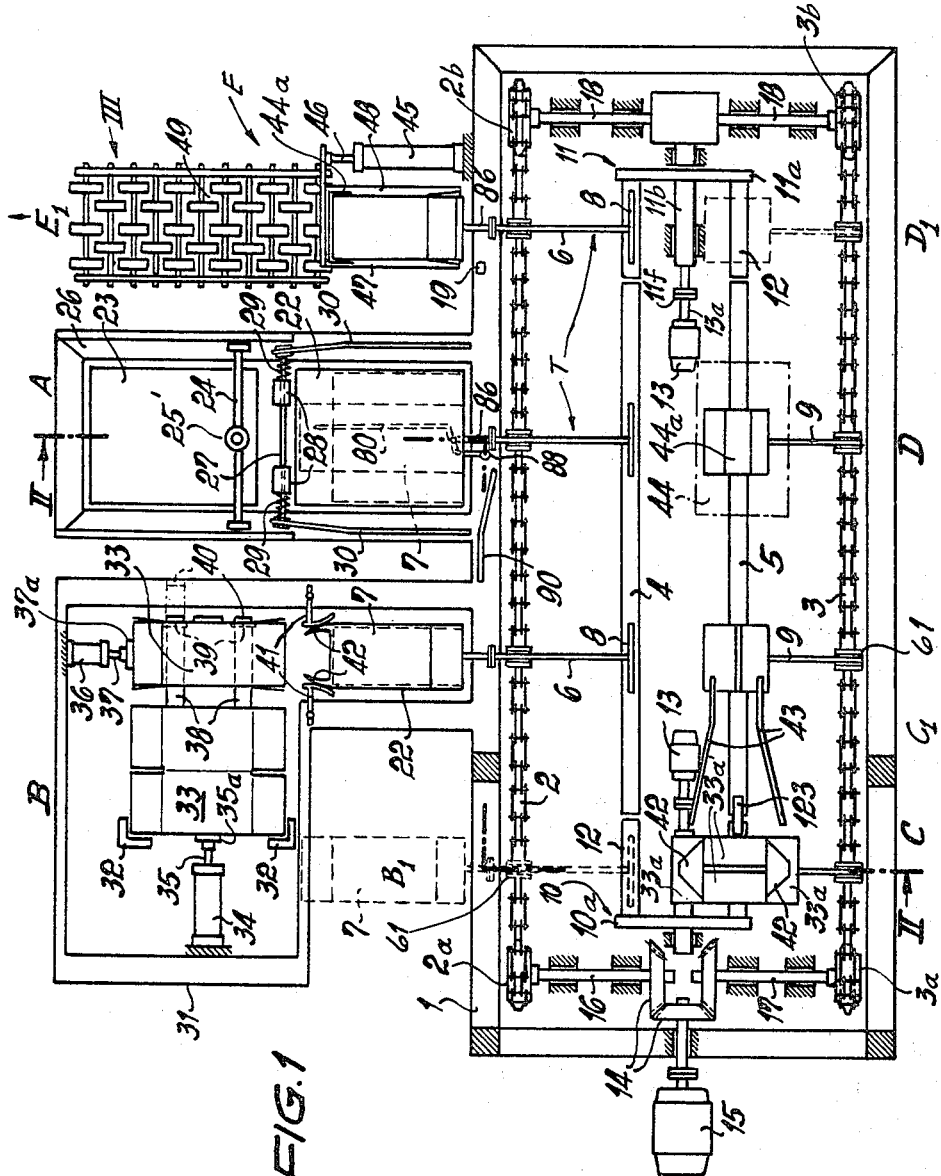
FIG. 1 is a horizontal section through a portion of an apparatus which is constructed in accordance with a first embodiment of our invention, the section being taken in the direction of arrows substantially as seen from the line I—I of FIG. 2.
Figure 2:
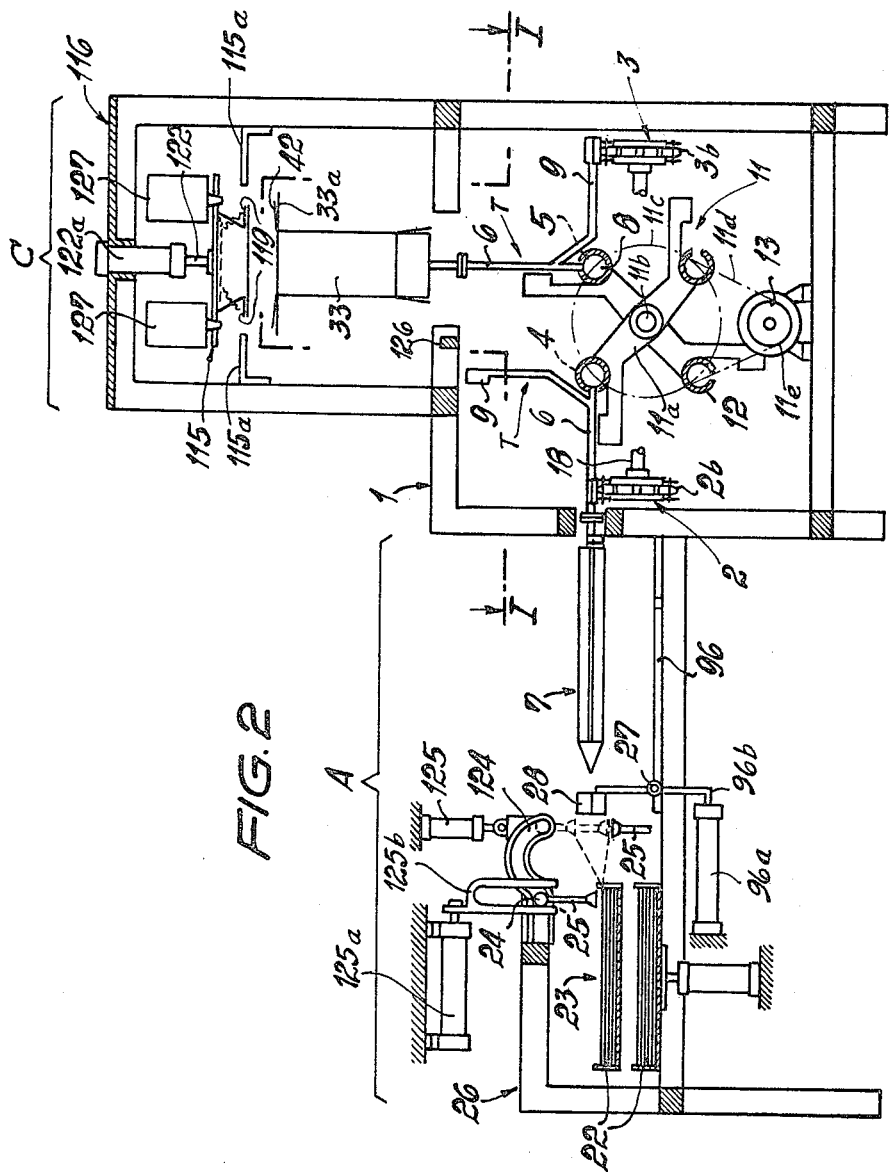
FIG. 2 is a vertical section as seen in the direction of arrows from the line II—II of FIG. 1.

Referring to FIGS. 1 and 2, the apparatus comprises a frame structure 1 which accommodates and supports two elongated longitudinal conveyors 2, 3 here shown as endless link chains whose upper stringers are located in a common horizontal plane and travel intermittently in opposite directions. Each chain is provide with equidistant motion transmitting lugs 61. The frame 1 further supports two elongated hollow horizontal guide rails 4, 5 of circular cross section. These rails are parallel to and are disposed between the upper stringers of the conveyors 2, 3. The rail 5 has an axially extending slot in the topmost portion thereof and the rail 4 has an axially extending slot located at that side which faces away from the rail 5 and in a plane common to the axes of the rails. The rails 4 and 5 serve to guide L-shaped supports T for a series of extensible and contractible spreaders 7. Each support T comprises a rod-shaped carrier 8 which is slidable in the rail 4 or 5, a radially extending supporting leg 6 which is connected to the respective spreader 7, and a radially extending balancing leg 9 which is connected to the leg 6. While a carrier 8 travels in the rail 5, the balancing leg 9 rests on the upper stringer of the conveyor 3 and is entrained by one of the legs 61. When a carrier 8 travels in the rail 4, the balancing leg 9 extends upwardly and the supporting leg 6 rests on the upper stringer of the conveyor 2 to be entrained by one of the lugs 61. In other words, the supporting legs 6 are horizontal when the corresponding carriers 8 travel in the rail 4, and the legs 6 are vertical when the corresponding carriers 8 travel in the rail 5.

The spreaders 7 travel in an endless path which is defined by the longitudinal conveyors 2, 3 and by a pair of transverse conveyors 10, 11. One of these transverse conveyors (namely, the conveyor 11) is shown in FIG. 2, and it will be noted that this conveyor comprises four substantially radially extending arms 11a which are rotatable by a horizontal drive shaft 11b. The shaft 11b is driven intermittently by a large pulley 11c, a belt 11d, a small pulley 11e and a clutch 11f provided on the output shaft 13a of an electric motor 13. Each arm 11a carries a tubular portion 12 which may move into and out of registry with one end of the rail 4 or 5 so that a carrier 8 may enter that tubular portion 12 which registers with the rail 5 and thereupon moves through an angle of 90 degrees to be in registry with the rail 4. The other transverse conveyor 10 is of identical construction, with the sole exception that its arms 10a rotate in the opposite direction in order to transfer carriers 8 from axial alignment with the rail 4 into axial alignment with the rail 5. The supports T travel along the conveyor 2 and rail 4 by moving in a direction to the left, as seen in FIG. 1. The conveyor 10 thereupon transfers such supports onto the conveyor 3 and rail 5 whereon the supports move in a direction to the right and on to the conveyor 11 to be transferred onto the conveyor 2 and rail 4, and so on in the just described endless path. The tubular portions 12 are slotted to receive the carriers 8 and the innermost portions of the corresponding supporting legs 6 so that the supports T cannot rotate with reference to the tubular portions 12 and are compelled to share intermittent angular movements of the transverse conveyors 10, 11.

The conveyors 2, 3 are driven intermittently by a transmission 14 which, in turn, is driven by an electric motor 15. The bevel gears of the transmission 14 drive two coaxial shafts 16, 17 to rotate the left-hand sprocket wheels 2a, 3a of the conveyors 2, 3. The right-hand sprocket wheels 2b, 3b are mounted on a common shaft 18. The shafts 16, 17 rotate in different directions and the sprocket wheels 2b, 3b are free to rotate on the shaft 18.

The frame 1 carries a fixed abutment member 19 in the form of a cam which extends into the pathway of consecutive supporting legs 6. This abutment member 19 is adjacent to the outer side of the conveyor 2 and is spaced from the sprocket wheel 2b. Its purpose is to rotate consecutive spreaders 7 through 90 degrees before the spreaders reach the first processing station. The frame also supports a fixed actuating cam 90 which serves as a means for initiating the extension of consecutive spreaders 7 and cooperates with rollers 88 provided on turnable brackets 86 of the supports T.

The various processing stations are located in part outwardly of and in part above the endless path for the supports T of the spreaders 7. Such stations include a combined storing and feeding station A at which the bags 22 are applied to collapsed spreaders 7. The bags are stacked in a source of supply here shown as a magazine 23. The station A is outwardly adjacent to the conveyor 2 and is followed by a station B at which the spreaders 7, now in extended condition, receive expanded boxes 33 from a magazine 32. The station A further accommodates a pneumatic transfer device including one or more stationary suction heads 25 and one or more movable suction heads 25' which latter are carried by a rod-shaped holder 24. The magazine 23 is surrounded at three sides by a fixed housing 26 the open side of which faces the conveyor 2 and is adjacent to the holder 24, this holder being reciprocable toward and away from the housing 26. A second rod-shaped holder 27 supports two expanders 28 which serve to apply the bags 22 to contracted spreaders 7 and consist of thin V-shaped metallic sheets whose apices extend in opposite directions. Springs 29 are provided to move the expanders 28 away from each other at the time the expanders enter the extended open end of a bag so that the expanders engage the internal surfaces of the bag with a force which suffices to separate the bag from the suction heads 25, 25' but without excessive stretching and eventual destruction of bag. The holder 27 is guided by a system of rails and sidings indicated by the numeral 30.

The second station B accommodates a housing 31 which supports the magazine 32 for boxes 33. The boxes 33 are stacked in collapsed condition and each thereof comprises four pairs of opposed flaps, two pairs at each end. The housing 31 also accommodates a feeding mechanism including a hydraulic or pneumatic cylinder 34 whose piston rod 35 is parallel to the upper stringer of the conveyor 2 and carries a pusher 35a serving to engage the adjacent lateral edge portion of the lowermost collapsed box 33 in the stack contained in the magazine 32 and to move the lowermost box sideways. A second hydraulic or pneumatic cylinder 36, also mounted on the housing 31, comprises a piston rod 37 having a pusher 37a adapted to engage the flaps at one end of that box 33 which has been removed from the magazine 32 and is ready to be applied around a bag 22 on the momentarily aligned spreader 7. The piston rod 37 is located in a horizontal plane and is normal to the upper stringer of the conveyor 2. The bottom portion of the magazine 32 includes two guide rails 38 which are parallel to the piston rod 35 and comprise stops in the form of upwardly extending side walls 40 hinged at 39 so that each such stop may be pivoted from a vertical plane to a horizontal plane or vice versa. In FIG. 1, the upper stop 40 is shown in horizontal position which is indicated by broken lines. The box 33 which is aligned with the piston rod 37 rests on the guide rails 38 and abuts against the upwardly extending stop 40. This box has been expanded in response to the pressure transmitted to one of its edges by the cylinder 34 and following engagement of another edge with the stop 40, whereby the stop 40 is pivoted upwardly, positioning the adjoining edge of the box diametrically relative to the edge engaging piston rod 37.

The station B also accommodates a pressing device including two pressing members 41 which are mounted opposite the cylinder 36 to rotate about two spaced parallel vertical axes and are biased by torsion springs 108 (see FIG. 8) in a direction to engage the lateral extensions or flaps 42 at the closed end of a bag 22 which is applied around a spreader 7. The extensions or flaps 42 of this bag 22 are moved so close to each other that the distance therebetween is less than the distance between the lateral flaps at the leading end of an expanded box 33 which rests on the guide rails 38. When the box 33 which rests on the guide rails 38 is caused to move forwardly, its leading flaps abut against the pressing members 41.

A first folding station C is located at a level above the transverse conveyor 10 and accommodates means for folding one pair of flaps at the upper end of the box 33 which is carried by a spreader 7. In FIG. 1, the folded-over flaps are identified by the numeral 33a', the unfolded ones by the numerals 33a. The extensions 42 of the bag 22 in the box 33 at the folding station C overlie the flaps 33a so that the folded-over flaps 33a' are located between the extensions 42. Thus, if the extensions are folded toward each other, they will abut against the outer sides of the flaps 33a' and may be concealed by the flaps 33a if the latter are folded so as to overlie the extensions. The folding of extensions 42 and flaps 33a may be carried out in a single step.

If desired, the folding station C may accommodate a paster which coats with adhesive the inner and/or the outer sides of the folded-over flaps 33a' so that such flaps will adhere to the body of the bag 22 and/or to the extensions 42. At the time the flaps 33a' are folded over, the extensions 42 and flaps 33a are preferably flexed outwardly to move out of the way and to insure that the flaps 33a' may be folded without meeting any obstructions. The extensions 42 and flaps 33a are then flexed to overlie the flaps 33a'. Such flexing is effected by two stationary folding fingers 43 at a second folding station $C_1$ shown in the lower left-hand portion of FIG. 1, and constituting a second folding device. These fingers are adjustable with reference to the frame 1 so as to be useful in treatment of differently dimensioned boxes.

A first sealing station D is located at a level above the guide rail 5 and accommodates a sealing device 44 which is used to secure the flaps 33a, 33a' and the extensions 42 in folded position. This sealing device may actually seal the upper ends of consecutive boxes 33 by applying an adhesive-coated strip across the gaps between the folded-over outer flaps 33a. Thus, at the time the boxes 33 leave the station D, their upper ends are properly closed or sealed and the bags 22 are anchored therein because the extensions 42 are received between the inner flaps 33a' and the outer flaps 33a. A sealing strip 44a which is applied by the device 44 is shown in the upper right-hand portion of FIG. 1. Alternatively, the station D may accommodate a stapling device which shoots or inserts staples through the flaps 33a and into the flaps 33a'.

On leaving the sealing station D, the spreaders 7 (each carrying a bag 22 and a partially sealed box 33) are transferred by the conveyor 11 and enter a combined stripping and transfer station E. This station E accommodates a horizontal cylinder 45 having a piston rod 46 to reciprocate a stripper including two movable stripping arms 47, 48. The arms 47, 48 grip the lateral side walls of the partially closed and/or sealed box 33 and strip it off the respective spreader 7, together with the bag 22 which is already anchored in the box. Such boxes are deposited on the rollers of an inclined transfer conveyor 49, see also FIG. 3, which delivers them to an erecting station $E_1$. The transfer conveyor 49 is long enough to accommodate two or more boxes 33 and thus serves as a collector of partially sealed boxes which is important if the next-following units cannot operate at the same speed as the units which are accommodated at the stations A–D. Also, the transfer conveyor 49 insures that the units accommodated at the next-following stations $E_1$, F, G, H, K and L can operate without interruption even if one of the units at the stations A–D is temporarily arrested for the purpose of inspection or repair.

Figure 3:
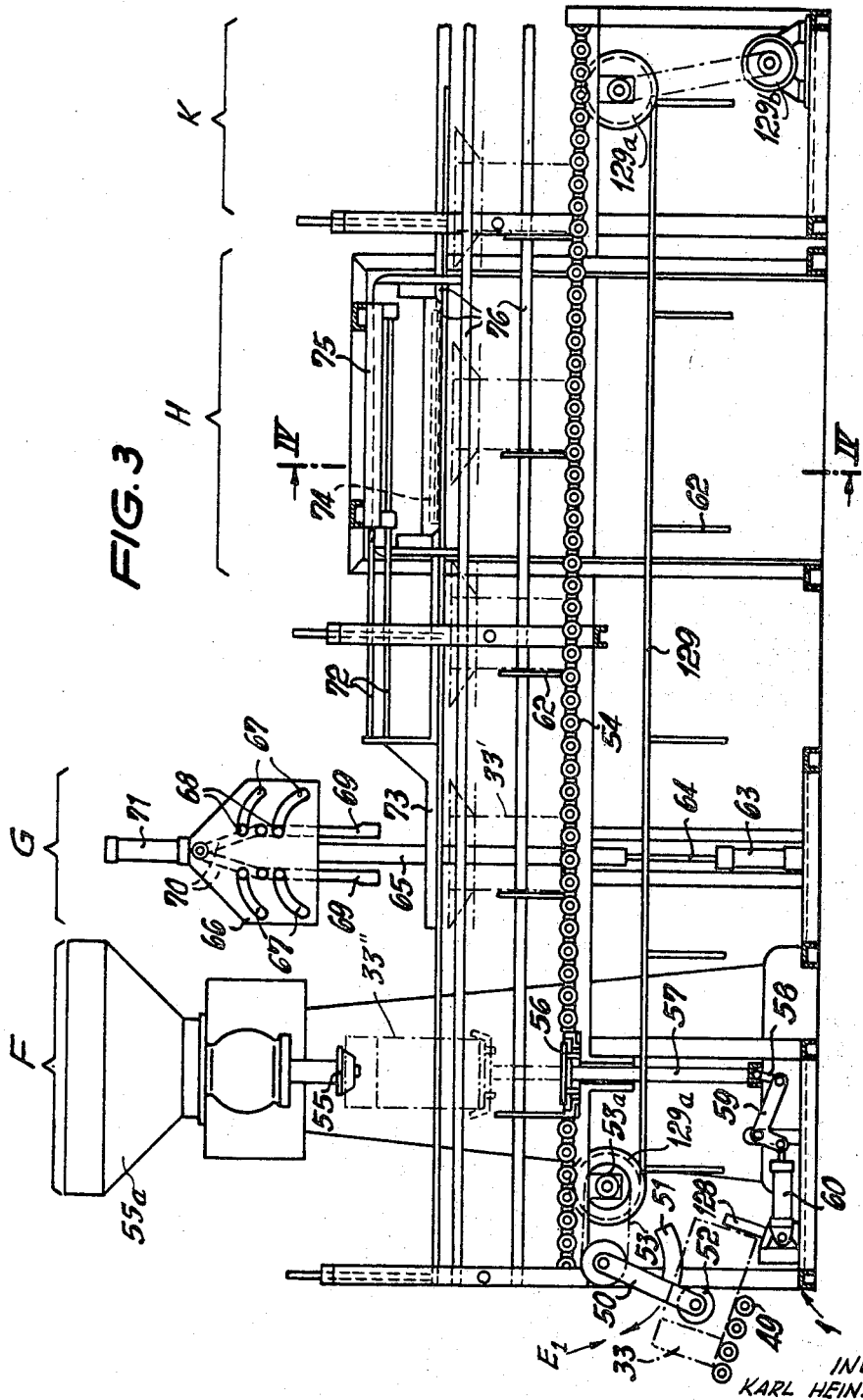
FIG. 3 is a side elevational view of the remainder of the apparatus substantially as seen in the direction of arrow III in FIG. 1.

Referring to FIG. 3, the station $E_1$ accommodates an erecting device which serves to deliver the boxes 33 in upright position. As shown, a box 33 which is advanced by the transfer conveyor 49 is nearly horizontal and, for the purpose of filling the bags 22, its open end must face upwardly as shown at 33' or 33". The erecting device includes a gripper somewhat similar to the stripping device 47, 48 and having two spring-biased gripping arms 50 which carry rotary disks 52 adapted to engage the opposite lateral side walls of a partially sealed box 33 on the conveyor 49. The arms 50 are driven to rotate about the axis of a horizontal shaft 50a and travel along the outer sides of opening cams 51. The cams 51 move the disks 52 away from each other to open the gripper so that the space between the disks may accommodate a box 33. Once the arms 50 move beyond the cams 51, they are compelled to move toward each other and the disks 52 grip the box 33 so that the latter is lifted and is automatically transferred onto a horizontal roller or apron conveyor 54 whereby the disks 42 are free to rotate with reference to the arms and the box automatically assumes a position in which its open end faces upwardly. The arms 50 are rotated by an endless chain 53 which is driven by a motor 53a.

The filling station F further accommodates a filling device 55 of conventional design which fills the bags 22 with a flowable material, e.g., with a liquid or a pulverulent, granular or otherwise comminuted substance. A platform 56 is disposed at a level beneath the filling device 55 and is accommodated in a gap between two aligned portions of the conveyor 54. The rollers of the conveyor 54 need not be driven, but this conveyor includes a series of suitably spaced motion transmitting lugs or plates 62 which compel the boxes 33' to advance in a direction to the right, as viewed in FIG. 3. The platform 56 forms part of a lifting device including two vertical columns or rods 57 which are reciprocable by link trains including short links 58, bell crank levers 59 and hydraulic or pneumatic cylinders or jacks 60. The levers 59 are fulcrumed at 59a and when the jacks 60 expel the piston rods 60a, the rods 47 are moved upwardly to raise the platform 56 above the level of the nearest motion transmitting member 62. Such dual construction of the lifting mechanism is necessary in order to allow for unobstructed passage of the members 62 which are connected to an endless chain 129 trained around sprocket wheels 129a one of which is driven by a motor 129b. The chain drive 129, 129a may be replaced by a belt and pulley drive.

The platform 56 is of particular importance if the bags 22 receive liquids which are likely to splash and to contaminate the filling station. Also, and if the material is a powder, the platform 56 will prevent dust from spreading around at the time such pulverulent material is admitted into a bag.

The platform 56 is reciprocated intermittently at regular intervals and in synchronism with the operation of the erecting device 50–53 to make sure that a fresh box 33 is transferred onto the roller conveyor 54 at the time the platform 56 begins to lift a box in registry with the discharge opening of the filling device 55. This filling device normally comprises a suitable measuring attachment to insure that each bag 22 receives a predetermined quantity of flowable material which is discharged by a storage tank 55a.

The filling station F is followed by a tensioning or smoothing station G accommodating a mechanism which serves to stretch or to even out that portion of the filled bag 22 which is to be sealed in the next-following operation. The mechanism at the station G includes a system of upright columns or rods 65 which are reciprocable by the piston rods 64 of vertical cylinders 63. The upper end portions of the rods 65 support a hood 66 having pairs of mirror symmetrical arcuate cam slots 67 for the follower pins 68 of a toggle mechanism including stretching arms 69 and links 70. The arms 69 extend downwardly and their end portions may grip the open end portion of a bag 22 to stretch it preparatory to sealing. The cylinder 63 serves to reciprocate the hood 66, and a further cylinder 71 serves to actuate the toggle mechanism 68–70.

Figure 4:
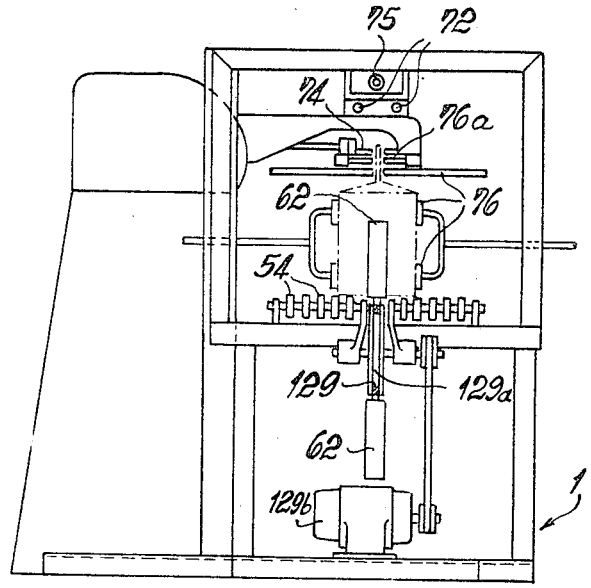
FIG. 4 is a transverse vertical section through the welding station substantially as seen in the direction of arrows from the line IV—IV of FIG. 3.

The second sealing or welding station H accommodates a reciprocable carriage 72 having rearwardly extending adjustable clamping rails 73 which are preferably located at a level slightly below the level of welding electrodes 74. The carrage 72 is reciprocable by a horizontal cylinder 75. The rails 73 are aligned with several pairs of mirror symmetrical stationary clamping rails 76 and with movable clamping rails 76a which latter are adjacent to the electrodes 74. The minimum distance between the rails 76a is less than the distance between the electrodes 74, see also FIG. 4. The rails 76 and 76a are adjustable as common so that they may be used in treatment of differently dimensioned boxes.

The welding station H is followed by a cooling station K wherein the freshly welded seams at the upper ends of the bags 22 may remain for an interval of time which is necessary to insure that the seams may cool by air or air jets prior to flexing of the upper pairs of opposed flaps on the boxes 33. The station K is followed by a third sealing or closing station L, shown in FIG. 5, at which the upper flaps of the boxes 33 are folded over each other whereby each box resembles a prismatic package which fully surrounds a properly sealed and filled bag 22. Such boxes may be delivered into storage, onto a vehicle for immediate delivery to customers, or to one or more additional processing stations, for example, to a labelling station, to a weighing and inspecting station, to a stacking station and/or to a tilting or inverting station.

It is obvious that the transfer conveyor 49 may deliver boxes 33 directly onto the conveyor 54 or that the conveyor 49 may be omitted if the conveyor 54 extends all the way to the station E. In such modified apparatus, the conveyor 54 will be combined with a different erecting mechanism which insures that the open ends of boxes 33 face upwardly not later than at the time they reach the filling station F. The conveyor 49 is normally provided if, for lack of space or another reason, the level of the conveyors 2, 3 differs from the level of the conveyor 54.

It is also clear that the distance between each pair of adjoining stations along the conveyors 2, 3, 10, 11 is a whole multiple of the distance between a pair of stations which are nearest to each other. The same applies for the stations which are distributed along hte conveyor 54. This is important because the conveyors are driven intermittently. All of the stations along the endless path of the spreaders 7 and/or along the conveyor 54 may be located at the same distance from each other.

FIGS. 6 and 6a illustrate the construction and operation of the spreaders 7. Each spreader comprises two large side walls or panels 77 which are located opposite each other, two pairs of smaller side walls 77a and a pair of end walls 79. The smaller side walls 77a are hinged to each other and to the adjacent longitudinal edge portions of the panels 77. The end walls 79 are also hinged to each other and to the adjoining transverse edge portions of the panels 77. Thus, there is no direct connection between the smaller side walls 77a and the end walls 79; therefore, the spreader may be contracted in a manner as shown in FIG. 6 (by full lines) or in the left-hand portion of FIG. 6a. When the spreader is contracted the lower panel 77 is near to the upper panel 77 and the side walls 77a of each pair make an acute angle. The end walls 79 also form an acute angle. When the spreader is extended, it resembles a box 7' which is shown in FIG. 6 by phantom lines and wherein the end walls 79 are located in a common vertical plane, the side walls 77a of each pair are also located in vertical planes, and the lower panel 77 is moved away from the upper panel. The hinges which connect the side walls 79 to each other and to the panels 77 are indicated at 78. Similar hinges 78a connect the side walls 77a to each other and to the panels 77.

The mechanism which is used to move the spreaders between the extended and contracted positions is shown in FIG. 6 and comprises an elongated rod 80 whose foremost end is connected with a pivot pin 81 to support a rockable link 80a. The free end of the link 80a is pivotally secured to the underside of the upper end wall 79 by a hoizontal pin 80b and the rod 80 is reciprocable axially in bearings 82 provided at the underside of the upper panel 77. Thus, when the rod 80 is pulled in a direction to the right, as viewed in FIG. 6, the end walls 79 are compelled to move into a common vertical plane 79' and the lower panel 77 is moved away from the upper panel to take the position 77'. Consequently, the side walls 77a are also compelled to move into two parallel vertical planes to transform the spreader 7 into a box-shaped body 7' which may be fitted into an expanded box 33.

Intermediate the bearings 82, the rod 80 carries a collar 83 which is biased by a helical spring 84 to keep the rod 80 in the position of FIG. 6 whereby the spreader 7 remains in contracted condition. The rear end portion of the rod 80 carries a laterally extending projection or nose 85 adapted to be engaged by a locking pawl 87. The rear end portion of the rod 80 also carries the roller 88 which serves to shift this rod against the bias of the spring 84 and to thereby extend the spreader. The pawl 87 is provided on the supporting bracket 86. The frame 1 comprises a lower frame member 89 which supports the fixed actuating cam 90 located in the path of the roller 88. The locking pawl 87 carries a motion transmitting roller 91 which may be engaged by an abutment member here shown as a fixed cam 92 provided on an upper frame member 93. The bracket 86 is L-shaped and its downwardly extending portion is rotatably secured to the leg 6 of the respective support T. A turning pin 94 is provided on the bracket 86 to rotate this bracket through an angle not exceeding 90 degrees.

The locking pawl 87 is biased by a spring 87a which normally keeps it in a position in which the pawl may engage the nose 85. The bias of the spring 87a may be overcome by the actuating cam 92 when the latter engages the roller 91 and causes the bracket 86 to rotate in a clockwise direction, as viewed in FIG. 6. The bracket 86 is fixed to the underside of the upper panel 77.

Figure 7:
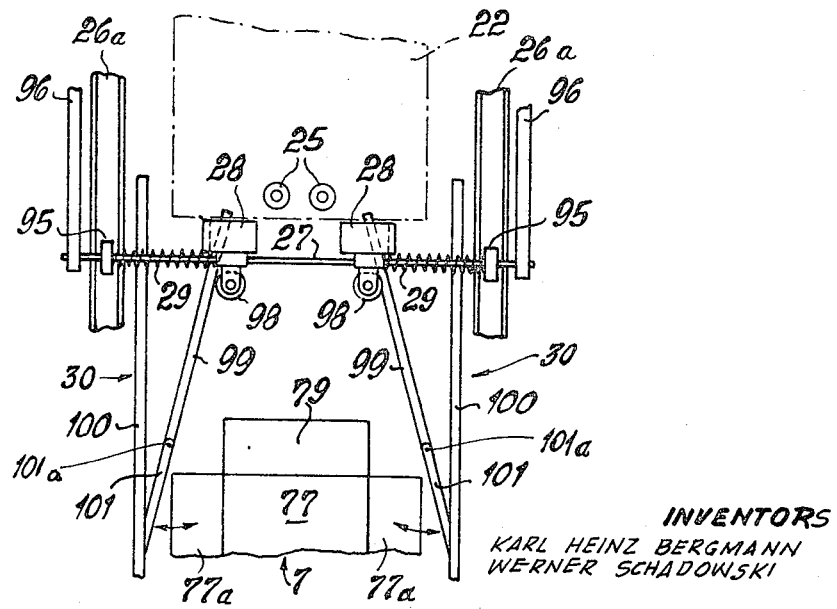
FIG. 7 is an enlarged fragmentary top plan view of the first feeding station.

FIG. 7 illustrates in greater detail the construction of the first feeding mechanism which is accommodated at the station A. The rod-shaped holder 27 carries wheels 95 and is reciprocable by push rods 96. The push rods 96 are reciprocable by the piston rod 96b of a cylinder 96a shown in FIG. 2. The wheels 95 travel on guide rails 26a secured to the housing 26. The expanders 28 are reciprocable along the holder 27 and are biased by resilient elements in the form of helical springs 29 which tend to move them away from each other. Each expander 28 carries a roller 98 which is arranged to track one of pairwise arranged mirror symmetrical guide rails 99, 100 and sidings 101 together constituting the system 30. As the rollers 98 track the guide rails 99 and sidings 101, the expanders 28 are compelled to move along the holder 27 and toward or away from each other. The expanders will be kept at a constant distance from each other when the rollers 98 track the rails 100. The fixed suction heads 25 are adjacent to the expanders 28 and the movable suction heads 25' are provided on the holder 24 to transfer a bag 22 from the source of supply, i.e., from the magazine 23, and into the range of the fixed suction heads 25. Thus, the two groups of cooperating suction heads 25, 25' will extend the open end of the bag 22 and will provide room for entry of the expanders 28 which are then in positions shown in FIG. 7.

The pressing members 41 are best shown in FIG. 8. They are mounted on a fixed crosshead 102 which carries two upstanding bearing sleeves 103 for rotary shafts 104. The lower end portions of the shafts 104 extend through and beyond the underside of the crosshead 102 and are connected to small pulleys 106 having peripheral grooves 105 to receive short cords 112. One end of each cord 112 is anchored in the respective pulley 106 and the other ends of the cords are fixed to the ends of a scale beam 111. The upper end portions of the shafts 104 carry radially extending L-shaped brackets 107 whose vertical arms are secured to the respective pressing members 41. The helical torsion springs 108 serve as a means for moving the pressing members 41 toward each other to the extent permitted by the cords 112. The fulcrum 111a of the scale beam 111 carries a radially extending lever 110 provided with a roller 109. A retracting bar 113 (shown by phantom lines) carries a trip 114 which serves to engage the roller 109 and to rock the scale beam 111 in order to pivot the pressing members 41 about the fixed axes of the respective shafts 104. The retracting bar 113 is operated by the cylinder 36 of the feeding mechanism at the station B and withdraws the pressing members 41 from the path of a freshly applied box so that the corresponding spreader 7 may advance toward the transverse conveyor 10.

FIG. 9 illustrates the construction of the first folding device at the station C. This folding device includes a folding head 115 which is suspended from and is reciprocable with reference to a supporting plate 116 mounted on the frame 1 so as to be located at a level above the transverse conveyor 10 and to be movable toward and away from the path of the spreaders 7. The suspension rods 117 are adjustable by arresting nuts 118 and 118' to maintain the head 115 at a requisite maximum distance from the plate 116 and at a requisite minimum distance from the conveyor 3. The head 115 comprises a series of hinged and fixed plate-like folding members which serve to fold the flaps 33a' and to unfold the extensions 42 and flaps 33a. The folding members 119 will engage the extensions 42 and will keep them from moving toward each other. The folding members 120 are fixed and are positioned in such a way that they may effect folding of the flaps 33a'. A reciprocable retaining member in the form of a horizontal strip 121 is provided between the folding members 120 to pivot the folding members 119 and to thereby move the extensions 42 and the flaps 33a outwardly. This strip 121 is reciprocable by a vertical push rod 112 which extends upwardly and may be moved with reference to the plate 116 and head 115. The strip 121 comprises a forwardly extending retaining portion 123 which keeps the flaps 33a' from opening up prior to folding of the extensions and flaps 33a by the fingers 43. The retaining portion 123 extends in a direction toward the second folding station where the extensions 42 and flaps 33a are folded over by the fixed fingers 43.

By adjusting the nuts 118 and/or 118' the operator may convert the folding head 115 for treatment of differently dimensioned boxes.

It will be noted that the upper horizontal edges of the folding members 119 extend into the path of the retaining strip 121 so that, when this strip moves downwardly, the members 119 pivot about their lower edges against the bias of springs 119a. When the strip 121 is lifted in response to an upward stroke of the rod 122 which is movable by a cylinder 122a shown in FIG. 2, it provides room for entry of a fresh box 33 in the station C.

The head 115 is reciprocable by one or more cylinders (not shown) to move between the nuts 118, 118'. In FIG. 2, the head 115 is shown in lifted position so that a box 33 may enter the station C. When the head descends, the inclined folding members 120 fold the flaps 33a' toward each other to move their horizontal edges beneath the strip 121. The strip 121 descends in the next step and moves the partially folded flaps 33a' to closed position in which the flaps 33a' are located in a common horizontal plane while the extensions 42 project laterally because they are folded outwardly by the members 119. The head 115 then rises but the strip 121 remains in the lower end position to keep the flaps 33a' from unfolding. Brackets 115a shown in FIG. 2 arrest the head 115 in the lower end position.

The apparatus of our invention is operated as follows:

As shown in FIG. 1, the magazine 23 at the feeding station A accommodates a stack of collapsed prefabricated bags 22. A spreader 7 which is kept by its spring 84 in contracted condition is advanced by one of the lugs 61 on the conveyor 2 to move in registry with the open side of the housing 26. The control system of the apparatus includes a series of microswitches, valves, photoelectric cells and analogous control elements whose exact construction forms no part of the present invention. This control system causes the holder 24 to move the suction heads 25' above the open end of the uppermost bag 22 in the magazine 23 and to transfer the open end of this bag onto the stationary suction heads 25. The ends of the holder 24 are guided in arcuate slots provided in guide rails 124 which are pivotally secured to the housing 26 and may be rocked by a cylinder 125. A second cylinder 125a comprises a piston rod which carries a forked shifter 125b serving to move the linkage 24 in the slots of the rails 124 so that the movable suction heads 25' advance toward the stationary suction heads 25 and thereupon upwardly as indicated by broken lines in FIG. 2 in order to extend the open end of the bag 22, i.e., to provide in the open end room for insertion of the expanders 28. In the next step, the holder 27 advances toward the thus extended open end of the bag 22 whereby the rollers 98 travel along the guide rails 99 shown in FIG. 7 and compel the expanders to move along the holder 27 and toward each other. When the rollers 98 move beyond the free ends of the rails 99, the springs 97 are free to contract whereby the expanders 28 move along the holder 27 and away from each other. At such time, the expanders have penetrated into the extended open end of the bag 22 and stretch this bag laterally, as viewed in FIG. 1 or 7 to the extent permitted by the material of the bag. The space between the expanders 28 is then wide and high enough to accommodate a contracted spreader 7. The application of the bag 22 onto the contracted spreader 7 takes place in response to return movement of the holder 27 whereby the rollers 98 travel along the guide rails 100 and downwardly, as viewed in FIG. 7. The return stroke of the holder 27 is long enough to move the closed (trailing) end of the bag 22 in abutment with the foremost edges of the end walls 79 on the contracted spreader 7. The expanders 28 continue to advance toward the conveyor 2 (see FIG. 1) so that they are withdrawn from the bag 22 which latter is now fully applied around the corresponding spreader 7. The sidings 101 are moved away from the guide rails 100 at the time the rollers 98 travel along the guide rails 100 and downwardly, as viewed in FIG. 7. However, when the holder 27 again advances toward a fresh bag 22, the sidings 101 are moved to positions shown in FIG. 7 so that the rollers 98 travel along the sidings and onto the corresponding inclined guide rails 99 to move the expanders 28 along the holder 27 and toward each other whereby the expanders may enter the extended open end of the next bag 22. In other words, when the expanders 28 move toward the magazine 23, they travel first along the guide rails 100, thereupon along the sidings 101, then along the inclined guide rails 99, and finally in directions away frnm each other (when the rollers 98 have moved beyond the free ends of the guide rails 99). When the expanders 28 move away from the magazine 23 and toward the contracted spreader 7, their rollers 98 travel along the guide rails 100 while the sidings 101 are pivoted at 101a to move away from the adjoining guide rails 100. Invariably, the bias of the springs 29 is selected in such a way that the expanders 28 engage the internal surfaces of a bag 22 with a force which suffices to separate the bag from the suction heads 25, 25' but without excessive stretching and eventual tearing or other damage to the bag.

The conveyors 2, 3, 10, 11 then advance by a step whereby the spreader 7 which has just received a bag 22 at the station A advances to the station B. During such advance, the roller 88 of the spreader (see FIGS. 1 and 6) travels along the fixed actuating cam 90 and withdraws the rod 80 in a direction to the right, as viewed in FIG. 6, whereby the rod 80 moves against the bias of the spring 84 and extends the spreader 7 which then moves to the position 7' of FIG. 6a. At the same time, the spring-biased locking pawl 87 engages the nose 85 and retains the spreader in the extended position 7'.

When the thus extended spreader arrives at the station B, the retracting bar 113 (see FIG. 8) has moved the trip 114 against the roller 109 to pivot the lever 110 in a clockwise direction and to thereby rock the pressing members 41 in directions to move them away from each other against the bias of the springs 108. Thus, the pressing members 41 are removed from the path of the extended spreader 7.

Even before, or not later than at the time when the spreader 7 reaches the station B, the piston rod 35 moves in a direction to the right, as viewed in FIG. 1, to remove the lowermost collapsed box 33 from the magazine 32 and to advance the box sideways along the guide rails 38 and in engagement with the stops 40 which are pivoted upwardly to automatically expand the box 33 in response to pressure transmitted by the pusher 35a. The piston rod 37 then performs a working stroke to transfer the expanded box 33 onto the extended spreader 7 which has been arrested in the position shown in FIG. 1 and carries a fully expanded bag 22. The piston rod 37 also shifts the retracting bar 113 (see FIG. 8) to release the roller 109 whereby the torsion springs 108 rock the pressing members 41 toward each other. The pressing members 41 engage the lateral extensions or flaps 42 at the closed end of the bag 22 which is applied around the extended spreader 7 and keep the extensions 42 in the positions shown in FIG. 1 so that the lateral flaps 33a at the leading end of the expanded box 33 may travel along the extensions 42 and along the side walls of the bag 22 on the spreader 7. During such advance of the box 33 in response to a working stroke of the piston rod 37, the lateral flaps 33a of the expanded box 33 strike against the pressing members 41 and are flexed outwardly until their resistance increases sufficiently to push the pressing members out of the way and to travel along the expanded bag 22 on the spreader 7. During such engagement with the pressing members 41, the lateral flaps 33a at the leading end of the expanded box 33 form a substantially funnel-shaped inlet which is of advantage because the side walls of the box 33 are free to slide onto and along the expanded bag 22.

Once the expanded box 33 is properly transferred onto the extended spreader 7 which is held at the station B, the piston rod 37 performs a return stroke and withdraws the retracting bar 113 whereby the trip 114 engages the roller 109 and causes the pressing members 41 to move against the bias of the torsion springs 108 and out of the path of the box on the spreader 7. The spreader is now free to advance toward the station B₁ shown in FIG. 5 and to be transferred by the conveyor 10 to enter the first folding station C. The spreader 7 is thereby rotated through 90 degrees and extends vertically upwardly beneath the folding head 115 of FIG. 9. While the support T of the spreader 7 advancing from the station B₁ toward the station C travels with the transverse conveyor 10, a first abutment member 126 (see FIG. 2) engages the turning pin 94 on the bracket 86 and rotates the entire spreader 7 through 90 degrees about a vertical axis so that the angular position of the spreader changes first because the spreader travels with the conveyor 10 and secondly because the spreader is rotated by the fixed abutment member 126. In other words, at the time it enters the first folding station C, the spreader has been rotated through 90 degrees in a vertical plane (coinciding with the plane of the arms 10a) and about its own axis to move the extensions 42 and flaps 33a' to the opposite sides of the conveyor 3.

In the next step, the head 115 descends and its folding members 120 fold the flaps 33a' between the extensions 42 whereas the extensions 42 (and hence the flaps 33a) at the upper end of the spreader 7 move outwardly in response to the action of folding members which are pivoted when the strip 121 descends. Thus, the members 119 fold the extensions 42 and the members 120 fold the flaps 33a'. However, the folding of flaps 33a' is completed by the strip 121 which descends subsequent to the descent of the head 115.

If desired, the head 115 may be provided with one or more pasters which coat the upper sides of the extensions 42 with layers of adhesive material. Such pasters may comprise spray nozzles 127, shown in FIG. 9, which are connected to suitable sources of adhesive material (see the supply conduits 127a) and are controlled by suitable valves which allow some adhesive to pass through the nozzles 127 at the time the rod 122 moves the strip 121 downwardly, i.e., at the time the extensions 42 are folded away from each other and their upper sides move to optimum positions for the application of adhesive.

The strip 121 remains temporarily in its lowermost position to retain the flaps 33a' in folded-over or closed positions. The spreader 7 then advances by a step whereby the flaps 33a' slide beneath the retaining portion 123 while the fixed folding fingers 43 engage the flaps 33a and fold them over the flaps 33a'. Of course, the extensions 42 are also folded and their adhesive-coated surfaces adhere to the outer surfaces of the flaps 33a' whereby the bag 22 is safely anchored in the box 33. Once the flaps 33a are located beneath the folding fingers 43, the flaps 33a' cannot spread outwardly and remain in closed positions shown in FIG. 1.

As stated above, the first sealing station D may accommodate any desired type of sealing mechanism. Thus, the device 44 which applies adhesive-coated sealing strips or bands 44a may be replaced by a stapling device or by any other arrangement which can insure that the flaps 33a are secured in folded-over positions in which they overlie the extensions 42 and flaps 33a' and are located in a common horizontal plane. All that counts is to close or to seal the upper ends of the boxes 33 at the sealing station D so that the corresponding bag 22 is anchored before the box reaches the station $D_1$ and is caused to move with the transverse conveyor 11.

The conveyor 11 causes the spreader to move into a horizontal plane and to transfer the partially sealed box into the space between the stripping arms 47, 48 at the station E. The piston rod 46 performs a working stroke to move the stripping arms 47, 48 away from the conveyor 2 and to strip the box 33 off the spreader 7. The bag 22 is anchored in the box and is automatically separated from the spreader which is now free to advance toward the station A. The box 33, with the bag 22 attached thereto, travels along the transfer conveyor 49 and enters the erecting station $E_1$. The stripping arms 47, 48 are normally biased to move their free ends toward each other but will strike against suitable cams (not shown) when the piston rod 46 is retracted into the cylinder 45 whereby the arms move away from each other and provide room for a fresh box 33. Similar cams move the stripping arms 47, 48 apart at the time the box is transferred onto the conveyor 49 so that the box is released and may advance toward the erecting station $E_1$.

The spreader 7 (which has been separated from the box 33 and bag 22) is entrained by a lug 61 on the conveyor 2 and advances toward the station A. During such movement of the spreader, the turning pin 94 strikes against the fixed abutment member 19 and causes the bracket 86 to rotate through 90 degrees. Also, the roller 91 is engaged by the fixed actuating cam 92 (see FIG. 6) and the locking pawl 87 is disengaged from the projection 85 whereby the spring 84 is free to expand to contract the spreader 7 to the full-line position of FIG. 6. Thus, the spreader is again in optimum position to enter a fresh bag 22 which is withdrawn from the magazine 23 in a manner as described above.

As shown in FIG. 3, the box 33 (with a bag 22 anchored therein) descends along the transfer conveyor 49 and engages a stop 128. The revolving erecting arms 50 are moved apart by the cams 51 so that their disks 52 are spaced from the side walls of the box 33 which abuts the stop 128. Once the arms 50 move beyond the cams 51, the disks 52 are compelled to grip the box 33 and to lift it onto the conveyor 54 (see the position 33' in FIG. 3). The sealed end of the box 33' rests on the rollers of the conveyor 54 and its still open end faces upwardly. The position of the stop 128 is selected in such a way that the disks 52 engage the side walls close to the open end of the box 33 so that the box automatically assumes an upright position as soon as the erecting arms 50 begin to travel upwardly. The box might swing back and forth but invariably assumes a vertical position at the time its closed end comes to rest on the rollers of the conveyor 54. Such upright box (in the position 33') is engaged by one of the motion transmitting members 62 and advances into registry with the filling device 55, i.e., onto the platform 56. The cylinders 60 cause the rods 57 to perform an upward stroke and to lift the box to the phantom-line position 33'' in which its open end is located immediately beneath the filling device 55.

In the next step, the filled box 33'' is caused to descend with the platform 56 and is entrained by a motion transmitting member 62 to advance beneath the hood 66 at the station G. The cylinders 63 cause the piston rods 64 to perform a downward stroke and to lower the hood 66. The lower ends of the stretching arms 69 are then closely adjacent to each other and penetrate into the open upper end of the filled bag 22. The cylinder 71 thereupon causes the arms 69 to move away from each other and to stretch the open end of the bag from inside to eliminate any folds which could lead to leakage and resultant contamination or escape of flowable material. The rails 73 then engage the stretched portion of the bag 22 whereby the uppermost end of the bag extends beyond the rails 73 and may be sealed at the welding station H. The arms 69 are moved toward each other and the hood 66 is lifted. The rails 73 are then moved in a direction to the right, as viewed in FIG. 3, because they form part of the carriage 72. Such movement of the carriage 72 and its rails 73 is effected by the cylinder 75. The rails 73 transfer the bag 22 into the space between the lower stationary rails 76 and the stretched portion of the bag enters the space between the upper rails 76a. The upper rails 76a are located at a level above the rails 76 and are movable toward each other to clamp the upper end portion of the bag 22 just below the zone where the bag is to be sealed by the electrodes 74. The electrodes then complete the sealing operation but the rails 76a remain in engagement with the bag after the electrodes are moved away from the sealed zone to insure that the material of the bag cannot adhere to the electrodes. Thus, the rails 76a engage the bag prior to welding, the electrodes 74 then weld the upper end portion of the bag just above the rails 76a, the electrodes move away from each other to be separated from the sealed zone, and the rails 76a are moved away from each other to release the fully sealed bag.

The sealed end portion of the bag may remain between the rails 76 at the time the corresponding box 33 is transferred to the cooling station K. Additional folding fingers (not shown) are provided to fold the freshly sealed zone of the bag 22 sideways at the time the bag advances toward the final sealing or closing station L. In this station, the upwardly extending flaps of the box 33 are folded over each other and over the sealed zone of the corresponding bag. The thus obtained package is ready for shipping or for storage.

FIG. 5 illustrates a somewhat modified apparatus which is combined with a machine for the production of bags from a continuous length of thermoplastic or similar strip or web material 300. A machine which may be utilized in the apparatus of FIG. 5 is disclosed, for example, in U.S. Patent No. 2,320,326 to Avery. The web 300 is stored on a reel 301 and is being formed into a tube 302 which is provided with a longitudinally extending welded seam 303 while passing along a sealing roller 304. The thus sealed tube 305 is then severed by a cutter 306 to yield bags 322 each having a sealed end and an open end. This can be achieved by severing the tube 305 along a line immediately adjacent to a transverse seam which is formed by the roller 304 or by a separate roller, not shown. Thus, when the bags 322 reach the station A', each thereof is provided with a closed end 307 which is the trailing end.

The mechanism at the station A is then inactive and the spreaders 7 advancing consecutively along the station A remain in collapsed condition to open up at the time they enter a bag 322 at the station A'.

Of course, if the mechanism at the station A' is idle, the apparatus of FIG. 5 will operate in the previously described manner. Thus, the spreaders 7 passing along the station A will enter consecutive bags 22 and will advance to the station B where they receive boxes 33. At the station $B_1$, the supports T of the spreaders 7 are engaged by the transverse conveyor 10 and are delivered to the station C where the flaps 33a' are folded over and, while advancing through the station $C_1$, the flaps 42 and 33a are folded over by the rails 43 shown in FIG. 1. At the station D the upper ends of the boxes 33 are sealed by the device 44 which applies strips 44a and, at the station $D_1$, the supports T are engaged by the transverse conveyor 11 to be delivered onto the conveyor 49 at the station E. The boxes are then delivered to the erecting station $E_1$, to the filling station F, to the tensioning station G, to the welding station H, to the cooling station K and on to the closing station L. As stated hereinbefore, the spreaders 7 remain in horizontal positions while advancing along the stations E, A, A', B and on to the station $B_1$. Thereupon, the spreaders 7 are maintained in vertical positions to advance along the stations C, $C_1$, D and on to the station $D_1$. The boxes 33 on the conveyor 49 are inclined but each thereof moves to an upright position while advancing from the erecting station $E_1$ and along the stations F, G, H, K and L. However, it is to be noted that the boxes 33 may be tilted as soon as the welding step at the station H is completed because the bags are secured to the boxes and any tilting of the boxes will not affect the position of bags with respect thereto. For example, the station L may accommodate closing mechanisms for the flaps of the boxes 33 which operate more satisfactorily if the open ends of the boxes 33 are not located at a level above but laterally of or even at a level below the remainder of the respective box. As a rule, the mechanisms at the station L will be similar to the mechanisms at the stations C, $C_1$ and D.

If the apparatus is to form packages consisting of a box 33 and two or more interfitted bags 22 or 322, the feeding mechanism at the station A or $A_1$ will perform two or more working strokes in rapid succession so as to apply a first bag directly over a contracted spreader 7 and to thereupon apply one or more additional bags over the first bag. Alternatively, the magazine 23 at the station A may accommodate a supply of interfitted bags.

The bags 22 or 322 may consist of paper, thermoplastic sheet material, metallic foil or a combination of such materials, e.g., one may use a sheet of paper one side of which is coated with metallic foil. The boxes 33 normally consist of cardboard, pasteboard, corrugated board or the like. Each box and/or bag may be provided with printed matter or other indicia to point out the spot where the bag or box may be opened or refilled. For example, one may utilize a tube or a spout which is driven through the box and through an enclosed bag to allow for evacuation of filler material.

Multiple bags are utilized in packages wherein the box is likely to be subjected to rough handling and/or where the entrapped material is likely to expand so as to subject the bag to excessive stresses.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A method of enclosing and anchoring collapsible bags of the type having an open end and a closed end in collapsible boxes of the type having two pairs of opposed flaps at one end thereof, comprising the steps of expanding a substantially horizontally disposed collapsed bag; expanding a substantially horizontally disposed collapsed box; introducing the bag into the box in a substantially horizontal direction so that the closed end of the bag is located substantially in a substantially vertical plane between the pairs of opposed flaps; turning the box together with the bag therein vertically through substantially 90° so that the closed end of the bag is located substantially in a substantially horizontal plane with the open end facing downwardly; folding one pair of opposed flaps to closed position; introducing an adhesive substance between the closed substantially horizontal end of the bag and at least one of the flaps; and folding the closed end of the bag, together with the other pair of opposed flaps, over the one pair of flaps to close the one end of the box and to simultaneously retain the closed end of the bag between the pairs of opposed flaps so as to anchor the bag to said one end of the box.

2. A method of enclosing and anchoring collapsible bags of the type having an open end and a closed end provided with at least one extension in collapsible boxes of the type having two pairs of opposed flaps at one end thereof, comprising the steps of expanding a substantially horizontally disposed collapsed bag; expanding a substantially horizontally disposed collapsed box in a substantially horizontal direction; introducing the bag into the box so that the extension is located substantially in a substantially vertical plane between the pairs of opposed flaps; turning the box together with the bag therein vertically through substantially 90° so that the closed end of the bag is located substantially in a substantially horizontal plane with the open end facing downwardly; folding one pair of opposed flaps to closed position so that the extension extends beyond the thus folded one pair of flaps; and folding the extension, together with the other pair of opposed flaps, over the one pair of flaps to close the one end of the box and to simultaneously retain the extension between the pairs of opposed flaps so as to anchor the bag to said one end of the box.

3. In a method of enclosing and anchoring collapsible bags of the type having a closed end provided with at least one extension and an open end in collapsible boxes of the type having two pairs of opposed flaps at one end thereof, the steps of forming a stack of substantially horizontally disposed prefabricated bags; consecutively removing bags from the stack and expanding the thus removed bags; forming a stack of substantially horizontally disposed collapsed boxes; consecutively removing collapsed boxes in a substantially horizontal direction from the last mentioned stack and expanding the thus removed boxes; consecutively introducing expanded bags in a substantially horizontal direction into expanded boxes so that the extensions are surrounded by the corresponding opposed pairs of flaps; turning the consecutive boxes together with the bag therein vertically through substantially 90° so that the closed end of the bag is located substantially in a substantially horizontal plane with the open end facing downwardly; folding one pair of opposed flaps on consecutive boxes to closed position so that the corresponding extention projects beyond the thus folded one pair of opposed flaps; and folding the extensions of consecutive bags, together with the other pair of opposed flaps on the corresponding boxes, over the one pair of flaps to close the one end of each consecutive box and to simultaneously retain the extensions between the corresponding pairs of opposed flaps so as to anchor the bag to said one end of the box.

4. In a method of enclosing and anchoring collapsible bags of the type having a closed end provided with at least one extension and an open end in collapsible boxes of the type having two pairs of opposed flaps at one end thereof, the steps of transforming a continuous web of thermoplastic sheet material into a tube; providing the tube with longitudinally spaced transverse seams and subdividing the tube into substantially horizontally disposed open-ended bags wherein said transverse seams form extensions at the closed ends thereof; consecutively expanding the bags in a direction from the open end toward the closed ends thereof; forming a supply of substantially horizontally disposed collapsed boxes; consecutively expanding the boxes and introducing consecutively expanded bags into consecutively expanded boxes in a substantially horizontal direction so that the extensions are surrounded by the corresponding opposed pairs of flaps; turning the box together with the bag therein vertically through substantially 90° so that the closed end of the bag is located substantially in a substantially horizontal plane with the open end facing downwardly; folding one pair of opposed flaps on consecutive boxes to closed position so that the corresponding extension projects beyond the thus folded one pair of opposed flaps; and folding the extensions of consecutive bags, together with the other pair of opposed flaps on the corresponding boxes, over the one pair of flaps to close the one end of each consecutive box and to simultaneously retain the extensions between the corresponding pairs of opposed flaps so as to anchor the bag to said one end of the box.

5. A method of filling, enclosing and anchoring collapsible bags of the type having a closed end provided with an extension and an open end in collapsible boxes of the type having two pairs of opposed flaps at each end thereof, comprising the steps of expanding a substantially horizontally disposed collapsed bag; expanding a substantially horizontally disposed collapsed box in a substantially horizontal direction; introducing the bag into the box so that the extension of the bag is surrounded by the flaps at one end of the box; turning the box together with the bag therein vertically through substantially 90° so that the closed end of the bag is located substantially in a substantially horizontal plane with the open end facing downwardly; folding one pair of opposed flaps at said one end of the box to closed position so that the extension projects beyond the thus closed pair of flaps; folding the extension and the other pair of opposed flaps at said one end of the box over the one pair of opposed flaps to close the one end of the box and to simultaneously retain the extension between the folded pairs of flaps so as to anchor the bag to said one end of the box; turning the box and the bag therein upside down so that the open end of the bag faces upwardly; filling the bag with flowable material through the open end thereof; smoothing the open end of the thus filled bag to eliminate folds therein and thereupon sealing the open end; and closing the flaps at the other end of the box over the thus sealed end of the bag.

6. A method of filling according to claim 5, further stretching the open end of the filled bag from inside to eliminate folds therein; and clamping the thus stretched open end from outside prior to sealing the thus clamped open end.

7. A method of anchoring, filling, sealing and enclosing collapsible bags of the type having a closed end provided with at least one extension and an open end in collapsible boxes of the type having two pairs of opposed flaps at each end thereof, comprising the steps of forming a series of collapsed bags; consecutively expanding the bags; forming a series of collapsed boxes; consecutively expanding the boxes and introducing expanded bags seriatim into such boxes so that the extension of each bag is surrounded by the flaps at one end of the corresponding box; maintaining the bags in substantially horizontal position during expansion and introduction into the corresponding boxes; folding one pair of opposed flaps on consecutive boxes to closed position so that the corresponding extension projects beyond the thus folded flaps; folding the extensions of consecutive bags, together with the other pair of opposed flaps on the corresponding boxes, over the one pair of flaps to close the one end of each consecutive box and to simultaneously anchor the extensions between the corresponding pairs of opposed flaps; maintaining each bag in substantially vertical position during folding of flaps at said one end of the corresponding box; advancing the boxes along an elongated path so that the open ends of the corresponding bags face upwardly; consecutively introducing into the bags measured quantities of flowable material; consecutively sealing the open ends of thus filled bags; and consecutively folding the flaps at the other end of each box to enclose the corresponding bag.

8. A method as set forth in claim 7, further comprising the steps of turning the box together with the bag therein vertically through substantially 90° so that the closed end of the bag is located substantially in a substantially horizontal plane with the open end facing downwardly; and rotating the box together with the bag therein 90° about its own axis prior to closing the flaps at the one end of the box.

9. A method according to claim 1 further comprising the steps of and applying an adhesive-coated sealing strip over the other pair of flaps to retain said flaps in closed position.

10. A method as set forth in claim 7, further comprising the step of stretching the open ends of consecutively filled bags to eliminate folds prior to sealing thereof.

11. A method according to claim 7 for anchoring, filling, sealing and wherein the open ends of the filled bags are consecutively sealed by the application of heat and pressure; and thereafter cooled.

12. A method according to claim 7 further comprising the steps of consecutively sealing the boxes by applying sealing strips over the folded pairs of opposed flaps.

13. A method according to claim 7 further comprising the steps of sealing the other end of each consecutive box.

14. An apparatus for enclosing and anchoring collapsible bags of the type having an open end and a closed end including at least one lateral extension in collapsible boxes of the type having two pairs of opposed flaps at one end thereof comprising a plurality of extensible and contractible spreaders each adapted to expand a bag; conveyor means for advancing said spreaders in an endless path; first feeding means adjacent to said path for applying collapsed bags onto contracted spreaders; first actuating means for extending the spreaders to thereby expand the bags thereon; second feeding means for delivering expanded boxes onto expanded bags in such a way that the closed end of a bag is surrounded by the flaps on the corresponding box; first folding means for folding one pair of flaps on each box to closed position so that the extension of the corresponding bag projects beyond such flaps whereby the extension of the closed end of each bag extends away from the spreader; second folding means for folding the extensions of consecutive bags and the other pairs of flaps on the corresponding boxes over the closed flaps to retain the extensions of the bags between the corresponding pairs of flaps; stripping means for separating the boxes and the corresponding bags from consecutive spreaders; and second actuating means for contracting the spreaders ahead of said first feeding means.

15. An apparatus for enclosing and anchoring collapsible bags of the type having an open end and a closed end including at least one lateral extension in collapsible boxes of the type having two pairs of opposed flaps at one end thereof, comprising a plurality of extensible and contractible spreaders each adapted to expand a bag; conveyor means for advancing said spreaders in an endless path; first feeding means adjacent to said path for applying collapsed bags onto contracted spreaders; first actuating means for extending the spreaders to thereby expand the bags thereon; second feeding means for delivering expanded boxes onto expanded bags in such a way that the closed end of a bag is surrounded by the flaps on the corresponding box; whereby the extension of the closed end of each bag extends away from the spreader paster means for applying adhesive between the closed ends of bags and the corresponding flaps; first folding means for folding one pair of flaps on each box to closed position so that the extension of the corresponding bag projects beyond such flaps; second folding means for folding the extensions of consecutive bags and the other pairs of flaps on the corresponding boxes over the closed flaps to retain the extension of bags between the corresponding pairs of flaps; stripping means for separating the boxes and the corresponding bags from consecutive spreaders; and second actuating means for contracting the spreaders ahead of said first feeding means.

16. An apparatus for enclosing and anchoring collapsible bags of the type having an open end and a closed end in including at least one lateral extension collapsible boxes of the type having two pairs of opposed flaps at one end thereof, comprising a plurality of extensible and contractible spreaders each adapted to expand a bag; conveyor means for advancing said spreaders in an endless path; first feeding means adjacent to said path for applying collapsed bags onto contracted spreaders; first actuating means for extending the spreaders to thereby expand the bags thereon; second feeding means for delivering expanded boxes onto expanded bags in such a way that the closed end of a bag is surrounded by the flaps on the corresponding box; whereby the extension of the closed end of each bag extends away from the spreader first folding means for folding one pair of flaps on each box to closed position so that the extension of the corresponding bag projects beyond such flaps; paster means cooperating with said first folding means for applying adhesive between the closed ends of bags and at least one pair of corresponding flaps; second folding means for folding the extensions of consecutive bags and the other pairs of flaps on the corresponding boxes over the closed flaps to retain the extensions of bags between the corresponding pairs of flaps; stripping means for separating the boxes and the corresponding bags from consecutive spreaders; and second actuating means for contracting the spreaders ahead of said first feeding means.

17. An apparatus for enclosing and anchoring collapsible bags of the type having an open end and a closed end including at least one lateral extension in collapsible boxes of the type having two pairs of opposed flaps at one end thereof, comprising a plurality of extensible and contractible spreaders each adapted to expand a bag, each of said spreaders comprising a pair of panels one of which is movable toward and away from the other thereof to respectively effect contraction and expansion of the spreader, a resilient means for moving said one panel toward the other panel, and disengageable locking means for holding said one panel against the bias of said resilient means; conveyor means for advancing said spreaders in an endless path; first feeding means adjacent to said path for applying collapsed bags onto contracted spreaders; first actuating means for engaging said locking means to thereby expand the bags thereon whereby the extension of the closed end of each bag extends away from the spreader; second feeding means for delivering expanded boxes onto expanded bags in such a way that the extension of a bag is surrounded by the flaps on the corresponding box; first folding means for folding one pair of flaps on each box to closed position so that the closed end of the corresponding bag projects beyond such flaps; second folding means for folding the extensions of consecutive bags and the other pairs of flaps on the corresponding boxes over the closed flaps to retain the extensions of bags between the corresponding pairs of flaps; stripping means for separating the boxes and the corresponding bags from consecutive spreaders; and second actuating means for disengaging the locking means ahead of said first feeding means so that the spreaders contract in response to the bias of the corresponding resilient means.

18. An apparatus as set forth in claim 17, wherein the panels of each spreader are hingedly coupled to each other and wherein said actuating means are fixed cams adjacent to said endless path.

19. An apparatus as set forth in claim 17, wherein said locking means comprises a pawl and a rod having a projection engaging said pawl when the corresponding spreader is in extended condition.

20. An apparatus for enclosing and anchoring collapsible bags of the type having an open end and a closed end including at least one lateral extension in collapsible boxes of the type having two pairs of opposed flaps at one end thereof, comprising a plurality of extensible and contractible spreaders each adapted to expand a bag; conveyor means for advancing said spreaders in an elongated path; first feeding means adjacent to said path for applying collapsed bags onto contracted spreaders; actuating means for extending the spreaders to thereby expand the bags thereon; second feeding means for delivering expanded boxes onto expanded bags in such a way that the closed end of a bag is surrounded by the flaps on the corresponding box; whereby the extension of the closed end of each bag extends away from the spreader first folding means for folding one pair of flaps on each box so that the extension of the corresponding bag projects beyond such flaps; second folding means for folding the extensions of consecutive bags and the other pairs of flaps on the corresponding boxes over the closed flaps to retain the extensions of bags between the corresponding pairs of flaps; and stripping means for separating the boxes and the corresponding bags from consecutive spreaders.

21. An apparatus for enclosing and anchoring collapsible bags of the type having an open end and a closed end including at least one lateral extension in collapsible boxes of the type having two pairs of opposed flaps at one end thereof, comprising a plurality of extensible and contractible spreaders each adapted to expand a bag; conveyor means for advancing the spreaders in an endless path so that the spreaders are located in a first plane while advancing in a first portion of said path and in a second plane while advancing in a second portion of said path; first feeding means adjacent to the first portion of said path for applying collapsed bags onto contracted spreaders; actuating means for extending the spreaders in the first portion of said path to thereby expand the bags thereon whereby the extension of the closed end of each bag extends away from the spreader; second feeding means for delivering expanded boxes onto expanded bags in the first portion of said path and in such a way that the closed end of a bag is surrounded by the flaps on the corresponding box; first folding means adjacent to the second portion of said path for folding one pair of flaps on each box so that the extension of the corresponding bag projects beyond such flaps; second folding means adjacent to the second portion of said path for folding the extensions of consecutive bags and the other pairs of flaps on the corresponding boxes over the closed flaps to retain the extensions of bags between the corresponding pairs of flaps; stripping means for separating the boxes and the corresponding bags from consecutive spreaders ahead of said first feeding means; and second actuating means for contracting the spreaders ahead of said first feeding means.

22. An apparatus as set forth in claim 21, further comprising means for rotating said spreaders through about 90 degrees intermediate said second feeding means and said first folding means.

23. An apparatus as set forth in claim 22, wherein the means for rotating said spreaders comprises a fixed abutment member adjacent to said path and turning means provided on each of said spreaders to cooperate with said fixed abutment member during advance of a spreader in the respective part of said path.

24. An apparatus for enclosing and anchoring collapsible bags of the type having an open end and a closed end in collapsible boxes of the type having two pairs of opposed flaps at one end thereof, comprising a plurality of extensible and contractible spreaders each adapted to expand a bag; conveyor means for intermittently advancing said spreaders in an endless path having two elongated parallel portions and two transverse portions extending between the ends of said parallel portions, said conveyor means comprising two longitudinal conveyors having parallel stringers arranged to travel in opposite directions and defining the elongated portions of said path, and two transverse conveyors for transferring the spreaders from one end of one of said stringers onto one end of the other stringer and from the other end of said other stringer onto the other end of said one stringer, said longitudinal conveyors having equidistant motion transmitting elements for advancing the spreaders and said transverse conveyors being arranged to rotate the spreaders through about 180 degrees during transfer between said stringers; first feeding means adjacent to one elongated portion of said path for applying collapsed bags onto contracted spreaders; first actuating means for extending the spreaders to thereby expand the bags thereon; second feeding means adjacent to said one elongated portion for delivering expanded boxes onto expanded bags in such a way that the closed end of a bag is surrounded by the flaps on the corresponding box; first folding means adjacent to the other elongated portion of said path for folding one pair of flaps on each box to closed position so that the closed end of the corresponding bag projects beyond such closed flaps; second folding means adjacent to said other elongated portion for folding the closed ends of consecutive bags and the other pairs of flaps on the corresponding boxes over the closed flaps to retain the closed ends of bags between the corresponding pairs of flaps; stripping means for separating the boxes and the corresponding bags from consecutive spreaders; and second actuating means for contracting the spreaders ahead of said first feeding means.

25. An apparatus as set forth in claim 24, wherein each of said spreaders comprises a support cooperating with said conveyors and further comprising means for guiding said supports when the corresponding spreaders are advanced by said longitudinal conveyors.

26. An apparatus according to claim 20 further comprising a source of collapsed bags, said first feeding comprising cooperating fixed and movable suction heads arranged to extend the open ends of bags and expanders arranged to penetrate into the thus extended open ends and to slip the bags onto the corresponding spreaders.

27. In an apparatus for assembling collapsible bags of the type having an open end and a closed end with collapsible boxes of the type having flaps at one end thereof, in combination, cooperating movable and fixed pneumatic transfer means for removing collapsed bags from a source of supply and for extending the open ends of such bags; a pair of reciprocable expanders arranged to enter the thus extended open end of a bag during movement in one direction and to separate the bag from said transfer means during movement in the opposite direction; guide means for moving said expanders toward each other during movement in said one direction; and resilient means for moving said expanders apart prior to movement in said opposite direction so that the expanders engage the internal surfaces of bags with a force which suffices to separate the bags from said transfer means but without excessive stretching and eventual destruction of bags.

28. A structure as set forth in claim 27, wherein each of said transfer means comprises at least one suction head and wherein said guide means comprises a system of rails and sidings cooperating with rollers provided on said expanders.

29. A structure as set forth in claim 27, wherein said guide means comprises a pair of parallel guide members which maintain the expanders at a constant distance from each other during separation of a bag from said transfer means.

30. In an apparatus for assembling collapsible bags of the type having an open end and a closed end including two lateral extensions with collapsible boxes of the type having two pairs of opposed flaps at each end thereof, in combination, an extensible and contractible spreader arranged to enter through the open end of a bag in contracted condition thereof and to thereupon extend to thereby expand the bag thereon whereby the extensions of the closed end extend away from the spreader; feeding means for applying a box around the bag on said spreader so that the closed end of the bag enters through one end of the box whereby the flaps and extensions might obstruct the insertion of the bag; and pressing means provided intermediate said feeding means and said spreader for folding the extensions of a bag on said spreader toward each other so that the bag may enter the box.

31. A structure as set forth in claim 30, wherein said pressing means comprises a plurality of spring-biased pressing members movable into and from the path of a box which is applied to a bag on said spreader, said pressing members being arranged to fold the flaps of each pair away from each other so that the flaps form a substantially funnel-shaped inlet for entry of the bag.

32. In an apparatus according to claim 30, further comprising a source of stacked collapsed boxes, said feeding means comprising first cylinder means for removing collapsed boxes sideways from said source, guide means for guiding the boxes during removal from said source, stop means arranged in the path of boxes on said guide means to expand the same in response to movement of a box along said guide means while the box is engaged by said stop means, and second cylinder means for transferring a thus expanded box into a bag on said spreader.

33. In an apparatus for assembling collapsible bags of the type having an open end and a closed end including two lateral extensions with collapsible boxes of the type having two pairs of opposed flaps at each end thereof, in combination, an extensible and contractible spreader arranged to enter through the open end of a bag in contracted condition thereof and to thereupon extend to thereby expand the bag thereon whereby the extensions of the closed end extend away from the spreader; feeding means for applying a box around the bag on said spreader so that the closed end of the bag enters through one end of the box whereby the flaps and extensions might obstruct the insertion of the bag; and pressing means provided intermediate said feeding means and said spreader for folding the extensions of a bag on said spreader toward each other so that the bag may enter the box, said pressing means comprising a pair of pressing members rotatable about fixed axes, resilient means for biasing said pressing members in a first direction to move said pressing members about the respective axes and into engagement with the corresponding extensions of a bag on said spreader, and withdrawing means for moving said pressing members away from said extensions and away from the flaps on a box which is applied around the bag on said spreader in response to operation of said feeding means.

34. A structure as set forth in claim 33, wherein said spreader is movable in an endless path and further comprising conveyor means for moving said spreader intermittently in said endless path so that the spreader advances into and out of registry with said feeding means, said withdrawing means being arranged to move said pressing members out of the path of the box which is applied around the bag on said spreader while the spreader is being moved out of registry with said feeding means.

35. An apparatus for enclosing and anchoring collapsible bags of the type having an open end and a closed end in collapsible boxes of the type having two pairs of opposed flaps at one end thereof, comprising a plurality of extensible and contractible spreaders each adapted to expand a bag; conveyor means for advancing said spreaders in an endless path; first feeding means adjacent to said bags for applying collapsed bags around contracted spreaders; first actuating means for extending the spreaders to thereby expand the bags thereon; second feeding means for delivering expanded boxes onto expanded bags in such a way that the closed end of a bag is located between the flaps on the corresponding box; first folding means for folding one pair of flaps on each box to closed position so that the closed end of the corresponding bag extends beyond such flaps, said folding means comprising a retaining member and means for reciprocating said retaining member toward and away from the closed flaps; second folding means for folding the closed ends of consecutive bags and the other pairs of flaps on the corresponding boxes over the closed flaps to retain the closed ends of bags between the corresponding pairs of flaps; stripping means for separating the boxes and the corresponding bags from consecutive spreaders; and second actuating means for contracting the spreaders ahead of said first feeding means.

36. An apparatus as set forth in claim 35, wherein said first folding means further comprises a folding head and at least one spring-biased folding member hingedly attached to said head and located in the path of said retaining member so as to move with reference to said head and in folding engagement with the closed end of a bag which is aligned with said first folding means.

37. An apparatus as set forth in claim 35, wherein said head is movable in directions toward and away from said path and further comprising adjustable arresting means for maintaining said head at a required distance from said path.

38. An apparatus according to claim 35 wherein said second folding means comprises stationary folding fingers arranged to fold the other pairs of flaps in response to movement of boxes in said path and along said folding fingers.

39. An apparatus according to claim 20, further comprising sealing means for securing the flaps at the one end of each consecutive box in folded position.

40. An apparatus as set forth in claim 39, wherein said sealing means comprises a device for applying adhesive coated strips about said other pairs of flaps.

41. An apparatus as set forth in claim 39, wherein said sealing means comprises a stapling device.

42. An apparatus according to claim 33, wherein said stripping means comprises a pair of reciprocable stripping arms arranged to engage opposite lateral sides of the boxes, and means for reciprocating said arms.

43. An apparatus for anchoring, filling, sealing and enclosing collapsible bags of the type having an open end and a closed end including at least one lateral extension in collapsible boxes of the type having two pairs of opposed flaps at each end thereof, comprising a plurality of extensible and contractible spreaders each adapted to expand a bag; first conveyor means for intermittently advancing said spreaders in an endless path; first feeding means adjacent to said path for applying collapsed bags to contracted spreaders; first actuating means for extending the spreaders to thereby expand the bags thereon whereby the extension of the closed end of each bag extends away from the spreader; second feeding means for delivering expanded boxes onto expanded bags in such a way that the closed end of each bag is surrounded by the flaps at one end of the corresponding box; first folding means for folding one pair of flaps at said one end of each consecutive box so that the extension of the corresponding bag projects beyond such flaps; second folding means for folding the extensions of consecutive bags and the other pairs of flaps at the one end of each consecutive box over the closed flaps to retain the extensions of bags between the corresponding pairs of flaps; stripping means for separating the boxes and the corresponding bags from consecutive spreaders; second actuating means for contracting the spreaders at a point located ahead of said first feeding means; second conveyor means for receiving separated boxes and for advancing such boxes in upright position so that the open ends of bags face upwardly; filling means for introducing flowable material through the open ends of bags in boxes supported by said second conveyor means; sealing means for sealing the open ends of thus filled bags; and closing means for closing the other end of each consecutive container to thereby enclose the corresponding sealed bag.

44. An apparatus as set forth in claim 43, wherein said second conveyor is arranged to advance the boxes in a straight path.

45. An apparatus for anchoring, filling, sealing and enclosing collapsible bags of the type having an open end and a closed end in collapsible boxes of the type having two pairs of opposed flaps at each end thereof, comprising a plurality of extensible and contractible spreaders each adapted to expand a bag; first conveyor means for intermittently advancing said spreaders in an endless path; first feeding means adjacent to said path for applying collapsed bags to contracted spreaders; first actuating means for extending the spreaders to thereby expand the bags thereon; second feeding means for delivering expanded boxes onto expanded bags in such a way that the closed end of each bag is surrounded by the flaps at one end of the corresponding box; first folding means for folding one pair of flaps at said one end of each consecutive box so that the closed end of the corresponding bag projects beyond such flaps; second folding means for folding the closed ends of consecutive bags and the other pairs of flaps at the one end of each consecutive box over the closed flaps to retain the closed ends of bags between the corresponding pairs of flaps; stripping means for separating the boxes and the corresponding bags from consecutive spreaders; second actuating means for contracting the spreaders at a point located ahead of said first feeding means; second conveyor means for advancing the boxes in an elongated path; erecting means for delivering boxes from said stripping means onto said second conveyor means so that the open ends of the corresponding bags face upwardly; filling means for introducing flowable material through the open ends of bags in boxes supported by said second conveyor means; sealing means for sealing the open ends of thus filled bags; and closing means for closing the other end of each consecutive container to thereby enclose the corresponding sealed bag.

46. An apparatus as set forth in claim 45, wherein said stripping means is arranged to separate boxes in inclined position and wherein said erecting means comprises spring-biased arms having rotary end portions for engaging opposite lateral sides of inclined boxes close to the open ends thereof so that each box automatically assumes an upright position during delivery onto said second conveyor means.

47. An apparatus for anchoring, filling, sealing and enclosing collapsible bags of the type having an open end and a closed end in collapsible boxes of the type having two pairs of opposed flaps at each end thereof, comprising a plurality of extensible and contractible spreaders each adapted to expand a bag; first conveyor means for intermittently advancing said spreaders in an endless path; first feeding means adjacent to said path for applying collapsed bags to contracted spreaders; first actuating means for extending the spreaders to thereby expand the bags thereon; second feeding means for delivering expanded boxes onto expanded bags in such a way that the closed end of each bag is surrounded by the flaps at one end of the corresponding box; first folding means for folding one pair of flaps at said one end of each consecutive box so that the closed end of the corresponding bag projects beyond such flaps; second folding means for folding the closed ends of consecutive bags and the other pairs of flaps at the one end of each consecutive bag over the closed flaps to retain the closed ends of bags between the corresponding pairs of flaps; stripping means for separating the boxes and the corresponding bags from consecutive spreaders; second actuating means for contracting the spreaders at a point located ahead of said first feeding means; second conveyor means for receiving separated boxes and for advancing such boxes in upright position so that the open ends of bags face upwardly; filling means for introducing flowable material through the open ends of bags in boxes supported by said second conveyor means, said filling means comprising a filling device located at a level above the boxes on said second conveyor means and means for lifting consecutive boxes above said second conveyor means and into registry with said filling device; sealing means for sealing the open ends of thus filled bags; and closing means for closing the other end of each consecutive container to thereby enclose the corresponding sealed bag.

48. An apparatus according to claim 43 further comprising material through the open ends of bags in boxes supported by stretching means located past said filling means for stretching the open ends of thus filled bags, said sealing means sealing the thus stretched open ends of the filled bags.

49. An apparatus as set forth in claim 48, further comprising clamping means to clamp the stretched open ends of consecutive bags while the corresponding boxes advance from said filling means toward said sealing means and while said sealing means seals the open ends.

50. An apparatus as set forth in claim 48, wherein the bags consist at least in part of heat-sealable material and wherein said sealing means comprises welding electrodes for heat-sealing the open ends of bags.

51. An apparatus as set forth in claim 49, wherein said clamping means comprises a plurality of fixed and movable clamping rails adjacent to said second conveyor means.

52. An apparatus for anchoring, filling, sealing and enclosing collapsible bags of the type having an open end and a closed end in collapsible boxes of the type having two pairs of opposed flaps at each end thereof, comprising a plurality of extensible and contractible spreaders each adapted to expand a bag; first conveyor means for intermittently advancing said spreaders in an endless path; first feeding means adjacent to said path for applying collapsed bags to contracted spreaders; first actuating means for extending the spreaders to thereby expand the bags thereon; second feeding means for delivering expanded boxes onto expanded bags in such a way that the closed end of each bag is surrounded by the flaps at one end of the corresponding box; first folding means for folding one pair of flaps at said one end of each consecutive box so that the closed end of the corresponding bag projects beyond such flaps; second folding means for folding the closed ends of consecutive bags and the other pairs of flaps at the one end of each consecutive bag over the closed flaps to retain the closed ends of bags between the corresponding pairs of flaps; stripping means for separating the boxes and the corresponding bags from consecutive spreaders; second actuating means for contracting the spreaders at a point located ahead of said first feeding means; second conveyor means for receiving separated boxes and for advancing such boxes in upright position so that the open ends of bags face upwardly; filling means for introducing flowable material through the open ends of bags in boxes supported by said second conveyor means, said second conveyor means comprising a roller conveyor having two spaced portions, motion transmitting elements for intermittently advancing the boxes along said roller conveyor, a platform located between the portions of said roller conveyor and located beneath said filling means, and means for intermittently lifting said platform so that a box momentarily located on said platform is moved nearer to said filling means; sealing means for sealing the open ends of thus filled bags; and closing means for closing and sealing the other end of each consecutive container to thereby enclose the corresponding sealed bag.

53. An apparatus as set forth in claim 52, wherein the distance between the stations at which said bags and said boxes are treated while advancing with said first and second conveyor means is a whole mulitple of a unit distance.

54. An apparatus as set forth in claim 52, further comprising adjustable clampings means for clamping the boxes and the open ends of corresponding bags subsequent to filling and while the open ends of the bags are being sealed by said sealing means.

55. An apparatus for anchoring, filling, sealing and enclosing collapsible bags of the type having an open end and a closed end in collapsible boxes of the type having two pairs of opposed flaps at each end thereof, comprising a plurality of extensible and contractible spreaders each adapted to expand a bag; first conveyor means for intermittently advancing said spreaders in an endless path; first feeding means adjacent to said path for applying collapsed bags to contracted spreaders; first actuating means for extending the spreaders to thereby expand the bags thereon; second feeding means for delivering expanded boxes onto expanded bags in such a way that the closed end of each bag is surrounded by the flaps at one end of the corresponding box; first folding means for folding one pair of flaps at said one end of each consecutive box so that the closed end of the corresponding bag projects beyond such flaps; second folding means for folding the closed ends of consecutive bags and the other pairs of flaps at the one end of each consecutive bag over the closed flaps to retain the closed ends of bags between the corresponding pairs of flaps; stripping means for separating the boxes and the corresponding bags from consecutive spreaders; second actuating means for contracting the spreaders at a point located ahead of said first feeding means; second conveyor means for receiving separated boxes and for advancing such boxes in upright position so that the open ends of bags face upwardly; filling means for introducing flowable material through the open ends of bags in boxes supported by said second conveyor means; sealing means for sealing the open ends of thus filled bags; closing means for closing and sealing the other end of each consecutive container to thereby enclose the corresponding sealed bag; adjustable clamping means for clamping the boxes and the open ends of corresponding bags subsequent to filling and while the open ends of the bags are being sealed by said sealing means, said clamping means comprising pairs of parallel clamping rails adjacent to and extending in the longitudinal direction of said second conveyor means and further comprising a reciprocable carriage supporting a pair of said rails so that such rails may remain in engagement with the open end of a bag while the corresponding box advances from said filling means to said sealing means.

References Cited

UNITED STATES PATENTS

| | | | |
|---|---|---|---|
| 1,948,657 | 2/1934 | Ferguson | 53—27 |
| 2,114,624 | 4/1938 | Bergstein | 93—6 |
| 2,162,263 | 6/1939 | Lindholm et al. | 93—36.01 |
| 2,255,975 | 9/1941 | Hultkrans | 93—36.01 X |
| 3,196,760 | 7/1965 | Terry | 93—44.1 |

FOREIGN PATENTS

| | | |
|---|---|---|
| 555,432 | 3/1957 | Belgium. |
| 1,822,374 | 11/1960 | Germany. |

WILLIAM W. DYER, JR., *Primary Examiner.*

FRANK E. BAILEY, *Examiner.*

N. ABRAMS, L. S. BOUCHARD, *Assistant Examiners.*